United States Patent [19]

Nagle

[11] Patent Number: 6,067,096
[45] Date of Patent: May 23, 2000

[54] METHOD AND SYSTEM FOR GENERATING REALISTIC COLLISIONS IN GRAPHICAL SIMULATIONS

[76] Inventor: John Nagle, 999 Woodland Ave., Menlo Park, Calif. 94025

[21] Appl. No.: 09/034,847

[22] Filed: Mar. 4, 1998

[51] Int. Cl.[7] .................................................. G06F 17/00
[52] U.S. Cl. ........................ 345/473; 345/473; 345/474; 345/958
[58] Field of Search ................................... 345/473, 474, 345/958

[56] References Cited

U.S. PATENT DOCUMENTS 5,625,575  4/1997  Goyal et al. ............................ 364/578

*Primary Examiner*—Mark R. Powell
*Assistant Examiner*—Lance W. Sealey
*Attorney, Agent, or Firm*—Townsend & Townsend & Crew LLP

[57] ABSTRACT

A method of computer operation and a software system for operating a computer to generate realistic collisions between animated bodies. The system operates the computer to iteratively calculate of body positions from previous positions using a simulated contact force between colliding bodies which has a nonlinear relationship with respect to the closest-points vector defined between the bodies such that the force increases sufficiently rapidly as the closest-points vector goes to zero to overcome the motions causing the collision between the bodies. The present invention also uses a similar relationship between a limiting torque for body part joints and a maximum allowed rotation for a joint for realistic motions of articulated body parts connected by joints.

36 Claims, 33 Drawing Sheets

| JOINT NAME | PARENT JOINT | OFFSET FROM PARENT | MASS | INERTIA MATRIX | JOINT HIGH LIMIT | JOINT LOW LIMIT |
|---|---|---|---|---|---|---|
| | | | | | | |
| | | | | | | |
| | | | | | | |
| | | | | | | |
| 31 | 32 | 33 | 34 | 35 | 36 | 37 |

*Fig. 2B*

| BODY NAME | OWNING JOINT | OUTLINE POINTS |
|---|---|---|
| | | |
| | | |
| 38 | 39 | 40 |

*Fig. 2C*

| BODY NAME | OUTLINE POINTS |
|---|---|
|  |  |
|  |  |
| 42 | 43 |

METHOD AND SYSTEM FOR GENERATING REALISTIC COLLISIONS IN GRAPHICAL SIMULATIONS

BACKGROUND OF THE INVENTION

This invention is related to the field of computer simulation of interacting bodies, and, more particularly, to techniques for simulating collisions between rigid bodies.

Recently, the drive toward realistic computer simulation has increased, especially in the field of computer games, which often tout their "virtual reality". For realistic simulations, researchers and software developers are moving toward physically-based modeling by which the motion and actions of bodies in the simulated system are determined by the laws of physics. In nearly any interesting computer simulation of the movements of bodies in an environment, collisions between bodies are likely, and in the graphics animation of many computer games, collisions are constant occurrences.

The classical technique for simulating collisions between rigid bodies has been the "spring-damper" approach. That is, in a simulated collision between two bodies, the repulsive force between the two bodies is considered to act like a spring. However, this technique has difficulties in handling some of the more complex cases, such as systems in which some of the bodies are coupled by articulated joints, or systems in which the collisions are highly energetic. Calculations for the simulations encounter numeric instability, overflow, and various other problems. Additionally, even if the numerical calculations remain stable, the calculations are often too slow for practical applications.

Because of these difficulties, researchers have turned to the "impulse" approach for simulating collisions. In this technique, the force between the colliding bodies is considered to be infinite for an infinitely small time interval to cause an instantaneous change in velocity for a colliding body. This impulse model is a rough approximation for forces in the real world and is a good model for colliding bodies which are very rigid, such as billiard balls. However, this approach is considered a rougher approximation of real world forces than the spring-damper model. For bodies of materials which are not totally rigid, the impulse model manifests its deficiencies by the generation of motions which are somewhat unrealistic.

The present invention solves or substantially mitigates these problems of physically-based modeling simulations with improvements in the spring-damper technique. Problems of numeric instability, overflow, and others are substantially reduced or avoided. Calculations for the simulation of collisions proceed at high speed for many practical applications. The present invention further provides for the efficient and realistic animation of simulated collisions.

SUMMARY OF THE INVENTION

The present invention provides for a method of computer operation for the realistic computer animation of colliding bodies by the iterative calculation of body positions from previous positions. The method comprises the steps of: receiving data defining physical properties of the bodies; determining a collision between two bodies; calculating a closest-points vector between the two bodies from the physical properties of the bodies; calculating a contact force on at least one of the bodies; calculating a position of the one body at a subsequent time interval in response to the contact force upon the body; iteratively repeating the collision determining, closest-points vector calculating, contact force calculating and position calculating steps for subsequent time intervals; and displaying calculated positions of the bodies at selected time intervals for a realistic animation of the colliding bodies.

The contact force is along the closest-points vector and has a nonlinear relationship with respect to the closest-points vector such that the force increases sufficiently rapidly as the closest-points vector goes to zero to overcome motions causing the collision between the bodies. Relationships for the contact force F, such as $$F = ae^{b(c-x)} - d, \text{ or } F = a/(b-x)$$

where a, b, c, and d are constants, x is the length of the closest-points vector, have been used. Likewise, similar relationships are used for the torque which limits the rotation of body parts about a joint for the realistic action of joints in collisions.

According to the present invention, calculation operations are monitored for faults. With a fault, a calculation operation is reinitialized and the operation proceeds for a smaller time interval. This process is iterated until the fault is eliminated from the operation.

Besides the method of operation, the present invention also comprises computer code stored in a computer-readable medium for these operations on a computer.

BRIEF DESCRIPTION OF THE DRAWINGS

FIG. 2B is a representative data structure for the body parts of the FIG. 2A figure; FIG. 2C is a representative data structure of the joints of the FIG. 2A figure;

DETAILED DESCRIPTION OF THE PREFERRED EMBODIMENTS

Present computer animation systems operate with key frames which provide the guideposts by which the computer system can "fill in" the graphics. These systems require extensive supervision or intervention by the human animator. In the computer animation of a human figure falling down a flight of stairs, for example, an animator initially positions the body and limbs of the figure at the top of the stairs and saves that information as a key frame of the animation. The animator then carefully positions the body and limbs of the figure immediately prior to the initial contact with the stairs. That information is also saved as a key frame. Then the animator visualizes the positions of the body and limbs at impact and saves a key frame with that information. The process continues in this repetitive manner as the figure falls down the stairs until all the key frames are saved and the graphics for the complete sequence are created. The animator plays back the sequence to reveal motions which appear to be incorrect when viewed at normal speed, or, even worse, motions which are not possible, such as portions of the body or limbs passing through the stairs. The animator then edits the sequence with the tools provided by the computer animation system. After extensive editing, a sequence of complex actions, such as a body falling down a flight of stairs, may appear realistic.

On the other hand, the present invention provides an animation system which is capable of providing a sequence of complex actions rapidly, accurately, i.e., realistically, and with minimal human intervention.

In the present embodiment, the present invention includes a software system which operates typically with a computer animation system on a general purpose computer. The computer animation system has the data for the characters and background for the required animation. The system of the present invention works with the computer animation system to allow the animation system to handle a sequence of complex actions in a realistic and efficient manner. For the purposes of this description, the computer animation system is described only in terms of its interaction with the system of the present invention. A commercial computer animation system which has been found to work effectively with the present invention includes Softimage (a registered trademark of Microsoft Corporation of Redmond, Wash.). Of course, other computer animation systems should also work effectively with the present invention.

Figure 1:
FIG. 1 is the end of an illustrative sequence of an animated character falling down a flight of stairs.
Figure 2A:
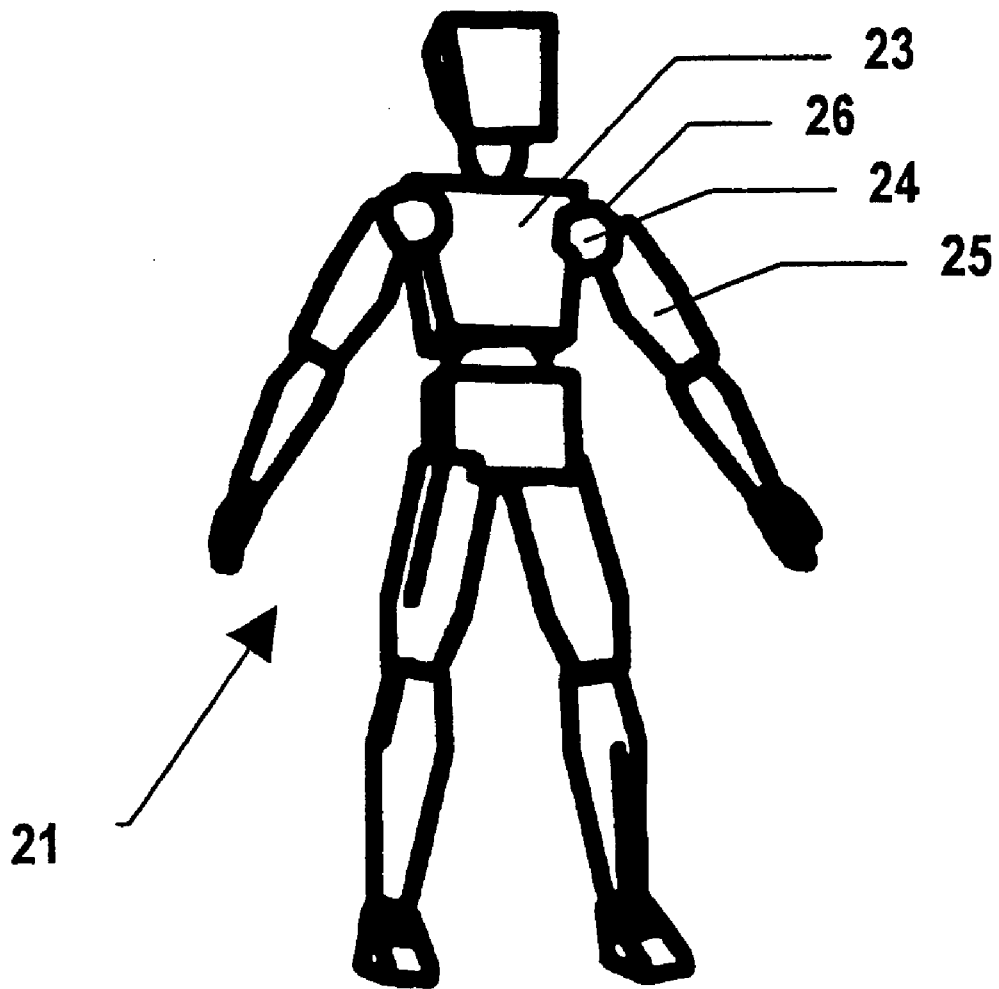
FIG. 2A illustrates a model of the character of FIG. 1.

FIG. 1 illustrates the end of an animation sequence in which a character 21 has fallen down the stairs 22 of a circular staircase. Primary input data to the system of the present invention (see FIG. 4 below), typically from the computer animation system, is the data of a model of the animated character 21 with its body parts exemplified by a torso 23, and joints exemplified by a shoulder joint 24, as illustrated in FIG. 2A. This example illustrates that a plurality of bodies, rather than only one, can be associated with a joint. A round body 26 which covers the shoulder joint 24 and the upper arm body 25 are both attached to the shoulder joint 24. These relationships are reflected in the data structures of the model.

The set of data structures of the model is illustrated in FIGS. 2B–2C, which define the physical properties of the character 21 for animation of the character 21 based upon the physically-based modeling of the character 21. FIGS. 2B and 2C include a table of joints and joint properties as shown in FIG. 2B, and a table of body parts and body part properties as shown in FIG. 2C. The FIG. 2B table of joints and joint properties contains sufficient information to determine the link structure of the joints of the character and the mass properties associated with the mass rigidly attached to each joint. Each joint entry has a joint name 31 and a parent joint 32, which may be null. This data defines the connections between the joints. Also associated with the each joint is an offset 33, a three-dimensional vector, from the parent joint, a mass 34, which is a scalar, and the inertia matrix 35, which is a set of six values defining the inertial properties of all the bodies attached to the joint. Finally, a joint high limit 36 and a joint low limit 37 define the allowed limits of rotation for the joint. The FIG. 2C table of body part properties contains the information used to define collidable bodies. Each body part name 38 is associated with an owning joint 39, and is described by a set of three-dimensional outline points 40. For the FIG. 2A model, for example, the FIG. 2C table can be considered to have two rows for the round body 26 and for the upper arm body 25, each associated with the owning shoulder joint 24. Each body part moves rigidly with its owning joint. Of course, in a simple case, the body part has no joint, i.e., the body part is a simple, non-jointed body, e.g., a billiard ball.

Figures 3A, 3B:
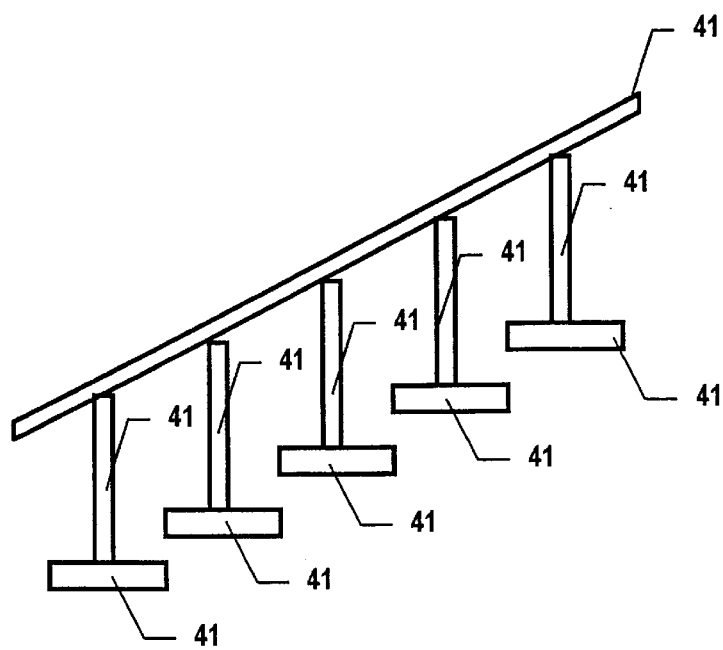
FIG. 3A illustrates a background for the character of FIG. 1.
FIG. 3B is a representative data structure of the background of objects which can interact with the FIG. 2A character.

Animation also requires background, such as illustrated in FIG. 3A. The data for a model of several background objects, such as the stairs 41 in FIG. 3A, for example, are represented in a form similar to the representation of the animated characters. FIG. 3B illustrates the background data structure, a table 42 of background object names, and a corresponding table 43 of sets of outline points, which define the location of the background objects in three-dimensions. Note that since background objects are stationary, they have no owning joints.

These data, character model and background model, are input data to a computer system operating according to the present invention. For a more complete understanding of the present invention, the present invention is described below from an organizational standpoint and from a process flow standpoint.

Organizational Description

Figure 4:
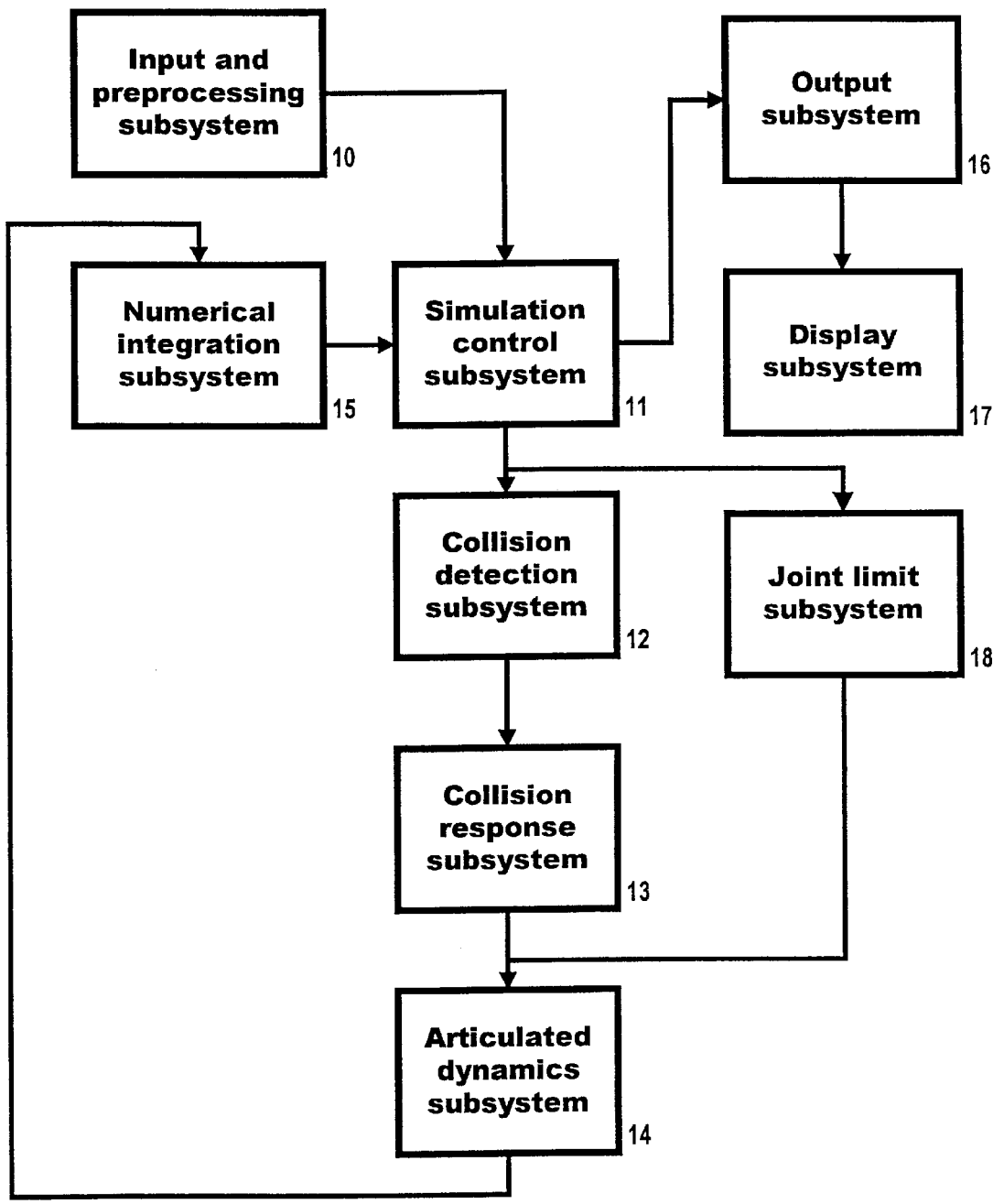
FIG. 4 is a block diagram of the general organization of the one embodiment of the present invention.

A general organization of the present invention is illustrated in FIG. 4. The organization has an input and preprocessing subsystem 10 which receives the input data, a simulation control subsystem 11, a collision detection subsystem 12, a collision response subsystem 13, an articulated dynamics subsystem 14, a numerical integration subsystem 15, an output subsystem 16, a display subsystem 17 and a joint limit subsystem 18. The result is that the output subsystem 16 updates an output file of joint angles and positions, with one full set of joint angles and positions, for each time interval. The file is suitable for use with the computer animation system as a data set of motion information which specify the motion of one or more animated characters.

Input and Preprocessing Subsystem

Figure 5:
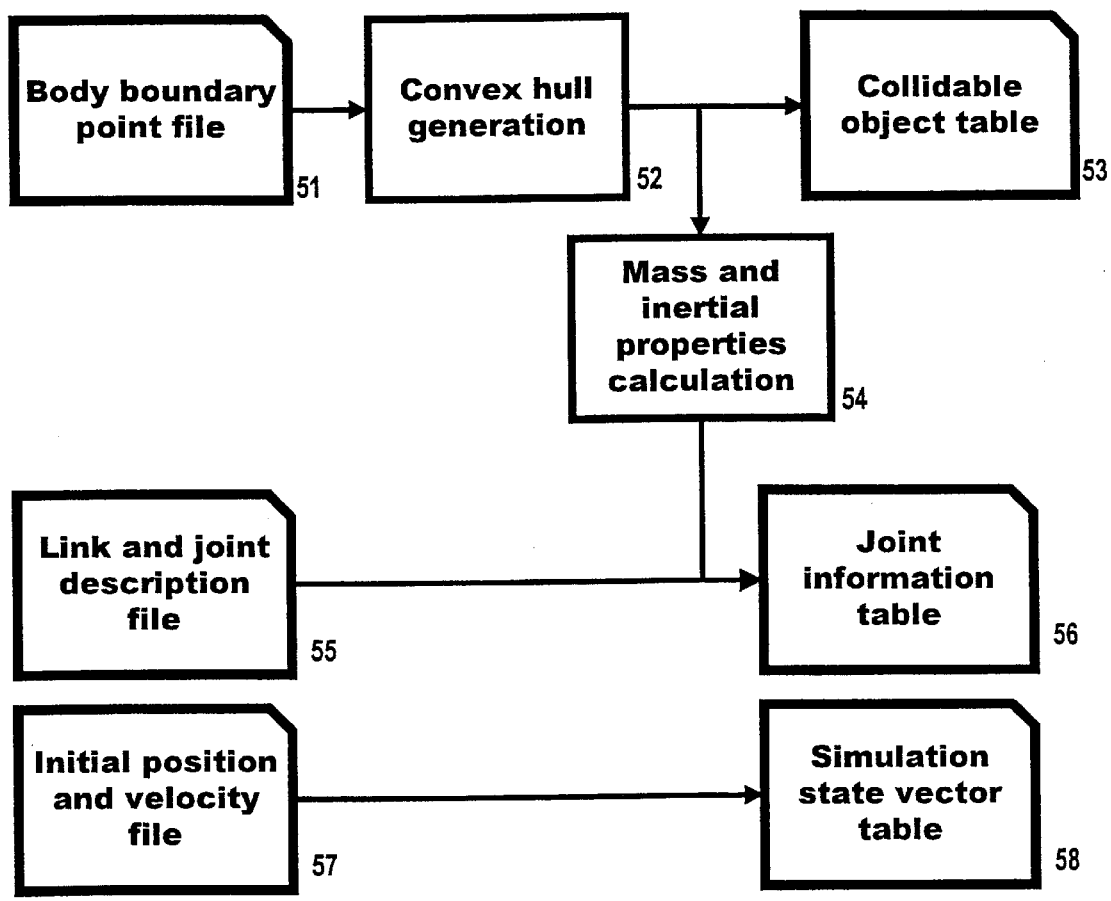
FIG. 5 is a block diagram of the input and preprocessing subsystem of the FIG. 6 system.

The input and preprocessing subsystem 10 is illustrated in greater detail in FIG. 5. For it should be noted that the drawings have a slanted line in the upper righthand corner of boxes to indicate a data file or table. As described above, the subsystem 10 receives input data from the computer animation system. This data is in a body boundary point data file 51, a link and joint description file 55, and an initial position and velocity data file 57, which describe the geometry and physical properties of an articulated character, its environment and initial state. These files are typically generated by the computer animation system. The subsystem 10 also allows input data to be added or modified though a simple keyboard and a computer mouse, or its equivalent. Input interface software for the entry of input data is well-known to software practitioners and therefore no further description of this aspect of the subsystem 10 is made.

Figure 6A:
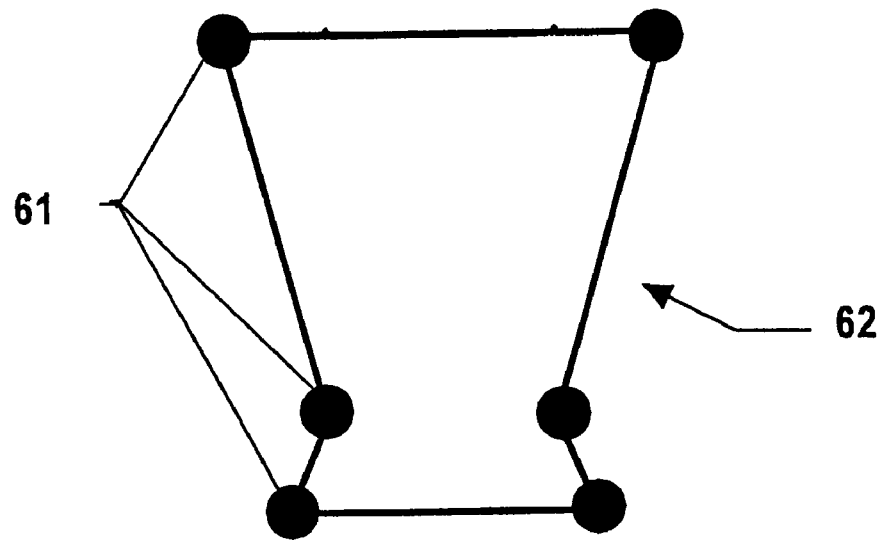
FIG. 6A is a representational view of a body defined by a set of outline points.
Figure 6B:
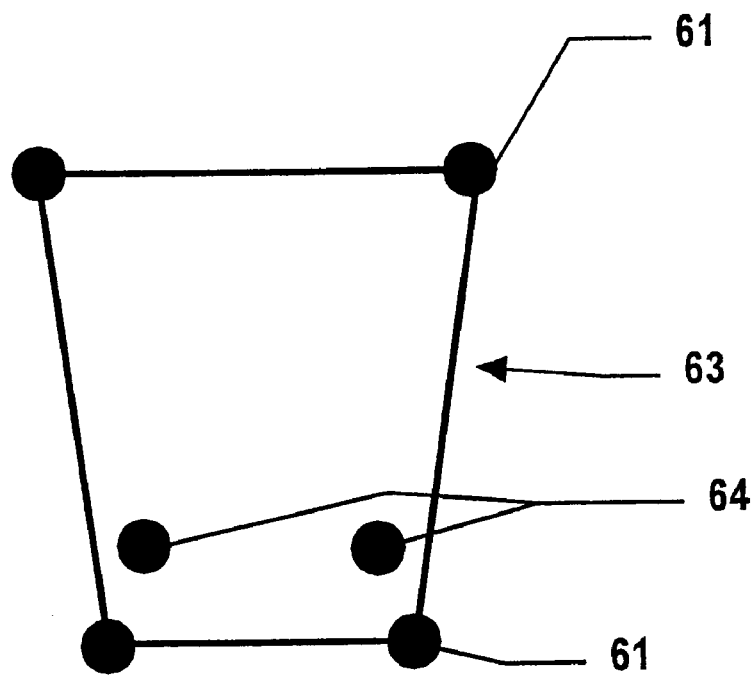
FIG. 6B is a convex hull of the FIG. 6A body.

The description of each body, or body part, provided to the system in the body boundary point file 51 is simply of a multiplicity of three-dimensional body outline points, exemplified by points 61 in FIG. 6A. The points 61 represent an outline of a body 62, which may be concave. The points 61 (or, more precisely, the positions of the points) are preprocessed by a convex hull generator 52, which computes a convex hull for the set of points 61, using any of the standard methods for doing so. A data structure representing a convex polyhedron 63, as shown in FIG. 6B, is obtained. The interior points 64 of the polyhedron 63, an artifact from the points 61 of the body 62, are dropped so that the concavities of the body 62 are filled in. Note that the system can handle a non-convex body by decomposing the body into several convex bodies interconnected by one or more joints.

There are advantages in generating a convex hull for a body. The computation of distances between convex objects is an especially efficient computation, and that the process of forming the convex hull eliminates any problems with ill-formed input geometry. The convex hull data structure is stored in a collidable object table 53 in FIG. 5, and is also used as input data to a mass and inertial properties calculation 54, which computes the center of mass and inertia matrix of each body. That computed information is merged with the data from the link and joint description file 55 to yield a joint information table 56.

In addition, the input processing subsystem 10 also reads the initial position and velocity file 57 and generates initial values for the simulation state vector table 58. This determines the starting conditions for the simulation.

Simulation Control Subsystem

Figure 7:
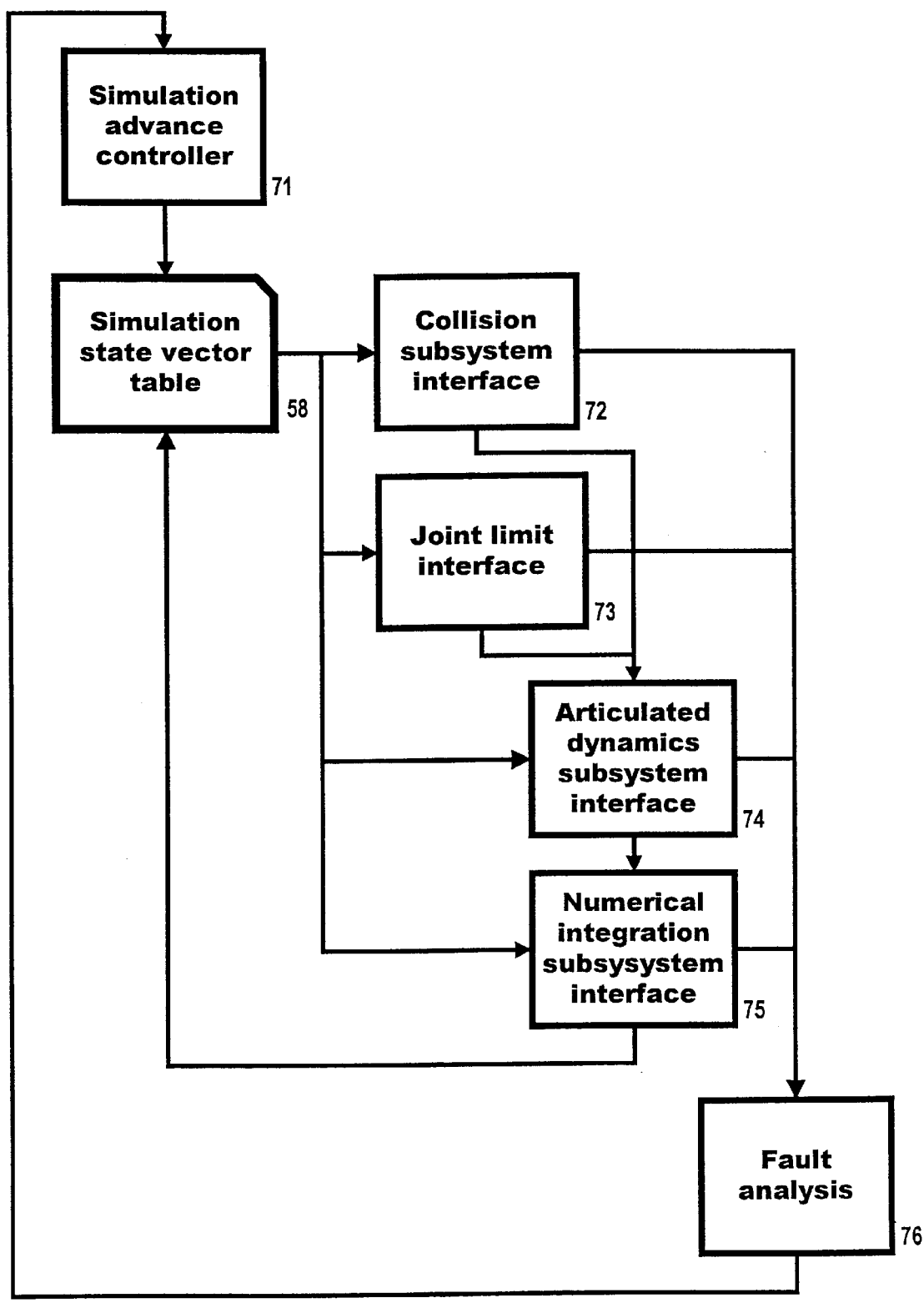
FIG. 7 is a block diagram of the simulation advance controller of the FIG. 4 system.

The simulation control subsystem 11 of FIG. 1, which controls the advance of the simulation one time interval at a time, is shown in greater detail in FIG. 7. Overall control is provided by a simulation advance controller module 71, which attempts to advance the simulation by a sequence of small time intervals. During the computational process involved in advancing the simulation by one time interval, it is possible that problems may occur which prevent the computation from proceeding correctly. The present invention includes checks for a multiplicity of events which may occur during the processing.

The simulation advance controller module 71 submits the simulation state vector table 58 to a collision subsystem interface module 72, and a joint limit interface module 73. These modules then compute and return force information representing the collision and joint limit forces, which information is then passed to an articulated dynamics subsystem interface module 74. The articulated dynamics subsystem module 74 computes the proposed changes to the simulation state vector table 58. The changes are integrated using a numerical integration subsystem interface module 75 to generate new values for the simulation state vector table 58. These values then become the starting values for the next time interval.

The above describes a normal sequence of events. However, in actual simulation work, it is quite common for one or more fault events to occur during the process of advancing the simulation by a time interval. Thus fault signals are provided from the collision subsystem interface module 72, the joint limit interface module 73, the articulated dynamics subsystem interface module 74, and the numerical integration system module 75. These fault signals are passed to a fault analysis module 76, which sends failure signals back to the simulation advance controller module 71. The simulation advance controller module 71 then takes corrective action by aborting the current computation and re-attempts the computation with a smaller time interval. The re-attempted computation may itself fail, which requires that the computation be attempted again with a still smaller time interval. Typically, a time interval is reduced by a factor of 0.5 with each failure, and the computation repeated with smaller and smaller time intervals until the computation succeeds.

The faults which can occur during the computational process involved in advancing the simulation by one time interval include, but are not limited to, the following: 1) floating-point numeric overflow occurring during the computation process; 2) unreasonably large values (a value with a magnitude of greater than $10^8$ is arbitrarily considered excessive) appearing in the simulation state vector table 58 used to represent the positions and joint angles of the bodies; 3) physically incorrect collision situations involving excessive interpenetration of bodies; 4) gimbal joints reaching a gimbal lock singularity; 5) updates to arbitrary-rotation joints resulting in non-normalized Euler parameters; and 6) joint with joint limits rotating beyond specified joint limits.

Figure 8A:
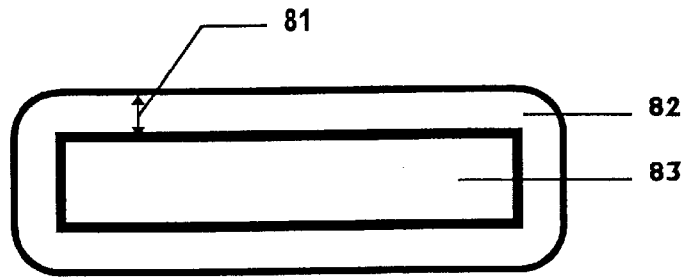
FIG. 8A is a representational view of a soft body according to the present invention.

The first two faults are straightforward computational problems and are readily understandable. Fault 3), physically incorrect collision situations, arise from the requirements of the present invention for physically realistic simulations. The present invention represents "soft" bodies, i.e., nonbilliard ball-type bodies, by a hard inner portion, a "bone", covered by a softer outer portion, a "skin". The bone of a body is considered hard and incompressible, while the skin is soft and elastically compressible. This differs from most prior art approaches, which typically use only one geometric figure to represent an object. FIG. 8A illustrates such a representative body having a bone polyhedron 83 covered by a skin polyhedron 82. A double-headed arrow 81 shows the thickness of the body's skin.

Figure 8B:
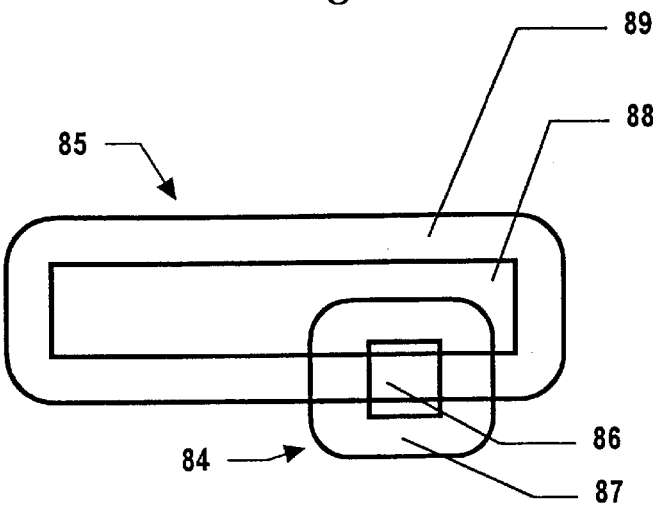
FIG. 8B is a representational view of two colliding soft bodies in a faulty "bone" to "bone" collision.
Figure 8C:
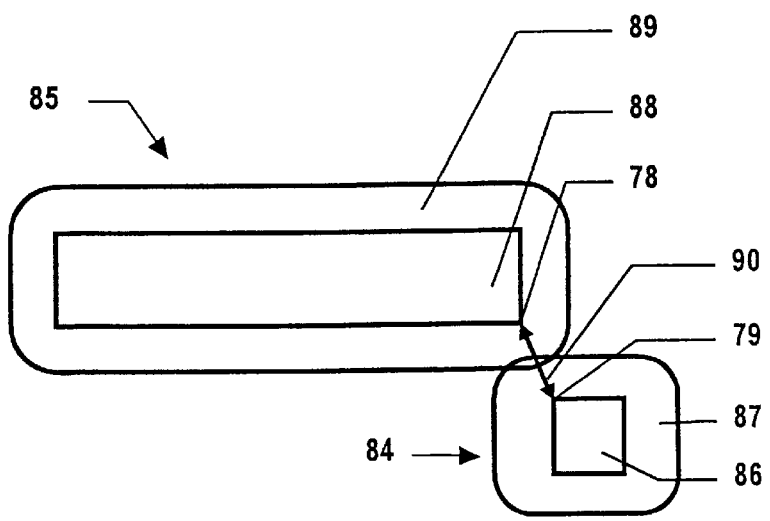
FIG. 8C is a representational view of two colliding soft bodies in a more realistic "skin" to "skin" collision.

Problems arise in situations, such as illustrated in FIG. 8B, in which two bodies 84 and 85 collide. The body 84 is represented by a bone polyhedron 86 and a skin polyhedron 87; the body 85 is represented by a bone polyhedron 88 and a skin polyhedron 89. In the collision between the two bodies 84 and 85, the bodies interpenetrate each other so that the bone polyhedra 86 and 88 overlap. The closest-points vector, defined between the bones of two bodies and shown by a double-headed arrow 90 in FIG. 8C, is not meaningful in this situation. Proper contact forces cannot be computed when there is bone-to-bone overlap. The present invention does not permit the simulation to operate in this region. This situation is treated as a fault event from which recovery is made, like other fault events, by using a smaller time interval.

Figure 9:
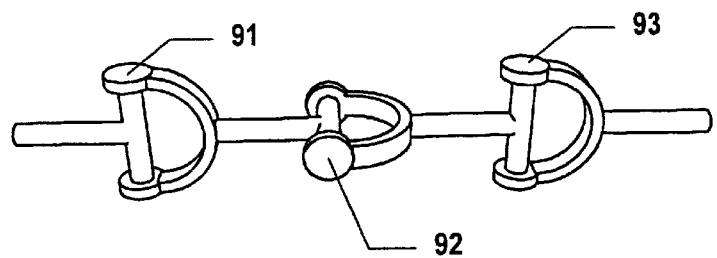
FIG. 9 is a representational view of three joints, illustrating a gimbal lock singularity fault.

The gimbal lock singularity of fault 4) is illustrated in FIG. 9. Three U-joints 91–93, each represent a joint with one rotational axis. Gimbal lock is a fundamental property of joints having three rotational axes represented by three angles. A gimbal lock occurs if and when the first joint axis (of the U-joint 91, for example) and the third axis (of the third U-joint 93) of a three-axis joint become aligned, as shown in FIG. 9. When this occurs, an ambiguity results in the computation. When simulations are performed by the present invention, gimbal lock is typically an artifact of an attempt to take a simulation interval which is too large, rather than a reflection of a true physical problem. Hence recomputation for a smaller time interval normally disposes of this fault.

Figure 10:
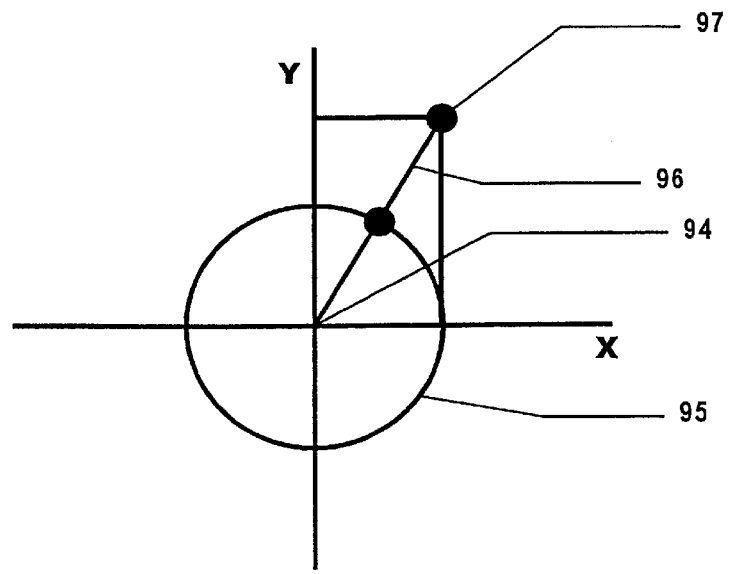
FIG. 10 is a two-dimensional representational of a quarternion.

Fault 5) occurs when Euler parameters become non-normalized. In computer graphics, arbitrary rotations are commonly represented as quaternions, which are sets of four values with the property, $x^2+y^2+z^2+w^2=1$. The variables, x, y, z, and w, form a quaternion. It is possible that computations on quaternions result in a sum which is not equal to 1, and repeated computations may increase the difference from 1. The error value E, where $E=x^2+y^2+z^2+w^2-1$, reflects this error. Should it exceed a small fraction of 1, denoted as $\epsilon$, the parameters are said to be non-normalized. Geometrically, this can be visualized in a simplified two-dimensional form illustrated by FIG. 10. Two values, x and y, define a point 97 and represent a rotation about a single axis 94. Here, the error value E, where $E=x^2+y^2-1$, corresponds to the distance from the end of the vector 96 (defined by point 97) to a unit circle 95. The pair of values (x,y) is said to be non-normalized if the point 97 is outside or inside the circle 95 by more than some value $\epsilon$. This expresses visually, for a rotation about a single axis, the concept of non-normalized Euler parameters. The case of rotation about three axis is more difficult to visualize, involving, as it does, a hypersphere in four dimensions. Nonetheless, the computation is similar.

Figure 11:
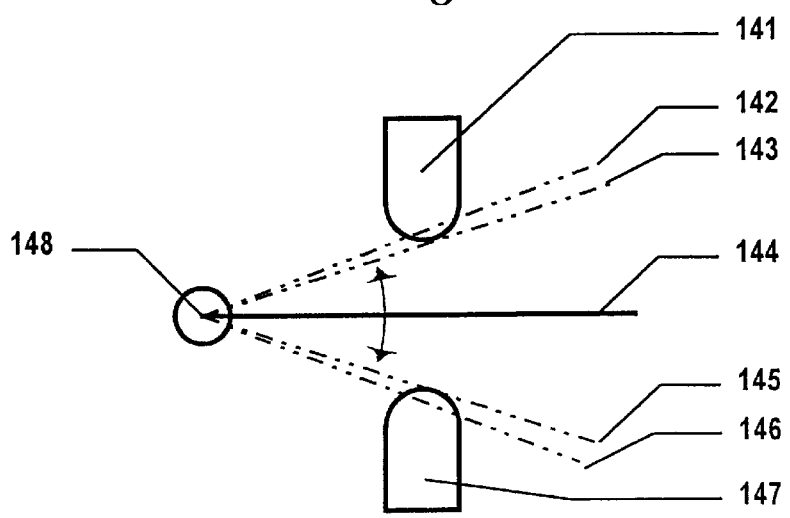
FIG. 11 is a representation of a joint with joint limits according to the present invention.

FIG. 11 explains fault 6) by a joint with specified joint limits rotates beyond these limits. The joint has an axis 148 about which a body part 144, a limb, can rotate. Stops 141 and 147 indicate limits to the rotation of the body part 144 about the axis 148 in both directions. Dotted lines 142 and 146 indicate the actual limits in the joint rotation. (The function and meaning of the other dotted lines 143 and 145 are discussed below.) A fault occurs when a calculation of the rotation about the axis 148 exceeds the limits defined by the lines 142 and 146.

Such faults as described above have been observed to significantly interfere with the correct operations of simulators up to the present. The present invention detects and handles these faulting events automatically.

Collision Detection Subsystem

Figure 12:
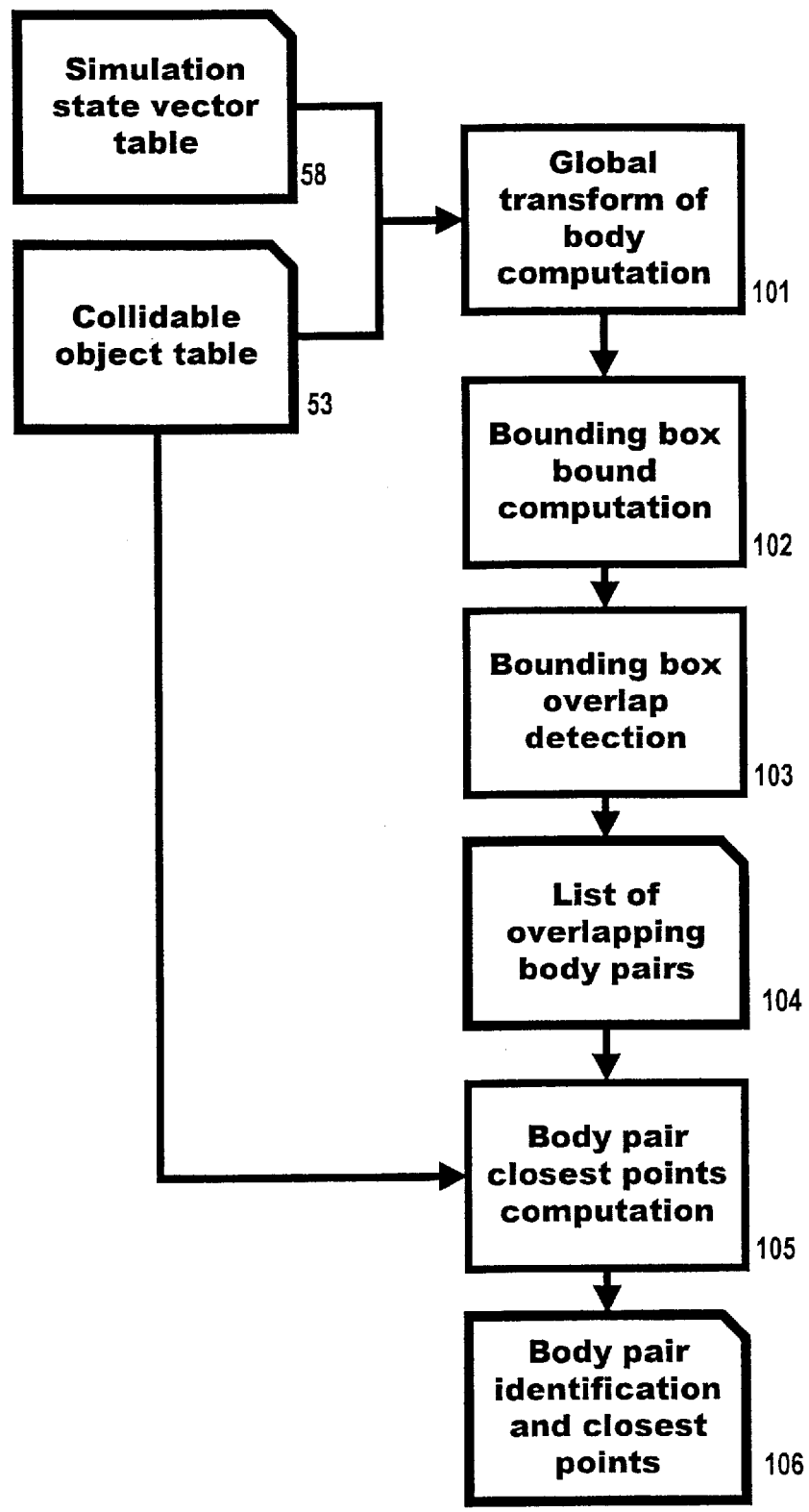
FIG. 12 is a block diagram of the collision detection subsystem of the FIG. 4 system.

The collision detection subsystem 12 in FIG. 4 determines when any two simulated bodies overlap and reports the distance between the two nearest points of all possible pairs of simulated bodies when these bodies do not overlap. The details of the collision detection subsystem 12 are shown in FIG. 12. The subsystem 12 receives input data from the simulation state vector table 58 which provides the current joint positions, and from the collidable object table 53 which provides information about all the bodies of the simulation. A global transform of body computation module 101 transforms the body information into global coordinates based on the current joint positions so that collision detection can be processed in global coordinates. Axis-aligned bounding boxes in global coordinates are computed by a bounding box bound computation module 102. This information is used for computations by a bounding box overlap detection module 103 to detects bodies which may be in contact. The module 103 operates according to a method described in an article, "I-COLLIDE: An Interactive and Exact Collision Detection System for Large-Scaled Environments," by J. Cohen, M. Lin, D. Manocha and K. Ponamgi, *Proceedings of ACM Int. 3D Graphics Conf.*, 1995, pp 189–196, which is incorporated by reference herein. The result of this computation is a list of overlapping body pairs 104, which contains all the body pairs which can possibly be in contact. Body pairs which are too far apart to be in contact are eliminated.

From this body pair information, a body pair closest-points computation module 105 determines the closest two points using a method described in "Enhancing GJK: Computing Minimum and Penetration Distances Between Convex Polyhedra," by S. Cameron, *Int. Conf. Robotics and Automation*, April 1997, which is incorporated by reference herein. As explained previously with respect to FIGS. 8A–8C, the present invention uses "skin" and "bone" models to effectively support elastic surfaces in a rigid-body simulation environment. Such models provide effective and realistic representations of human and animal bodies for collision purposes. The computation by the module 105 utilizes the bones in the two bodies to determine the closest points in the two bodies. For example, with respect to FIG. 8C, the closest points 78 and 79 on the bodies 85 and 84 respectively determine the closest-points vector 90. The magnitude of the vector 90, of course, is the distance between the closest points 78 and 79. As explained in greater detail below, this vector is used for the force computation between the two bodies 85 and 84.

The module 105, which operates according to the method in the above-cited article by Cameron, accurately calculates the distance between the two closest points on two convex bone polyhedra. Accuracy in this distance calculation is important since even minor errors in a distance calculation can cause the simulation to become grossly inaccurate. Thus the distance-measurement technique is chosen carefully and implemented correctly. To increase the efficiency of the calculations, the module 105 also uses the axis-aligned bounding box method described in "A Fast Algorithm for Incremental Distance Calculation," by M. Lin and J. Canny, *IEEE Int. Conf. Robotics and Automation,* April 1991, pp. 1008–1014, which is incorporated by reference herein, to avoid the unnecessary computation of distances between bodies which are too far apart to be considered for possible collisions.

The numerical algorithms of Cameron and of Lin and Canny involve iterations which converge on a solution. On rare occasions, these algorithms may not terminate for certain situations in which convergence fails to occur. The module 105 also has checks to the algorithms. The checks detect such rare cases and take appropriate recovery action. A detailed analysis of this "cycling" problem is disclosed, and a solution is proposed, in "V-Clip: Fast and Robust Polyhedral Collision Detection," by Brain Mirtich, *ACM Transactions on Graphics,* 1997, which is incorporated by reference herein. However, the present invention uses a simpler solution, that of detecting the cycling algorithm by comparing the current state of the algorithm with previous states.

The final result of the collision detection subsystem 12 is a list 106 of colliding pairs of bodies with the closest points for each pair.

Collision Response Subsystem

Figure 13:
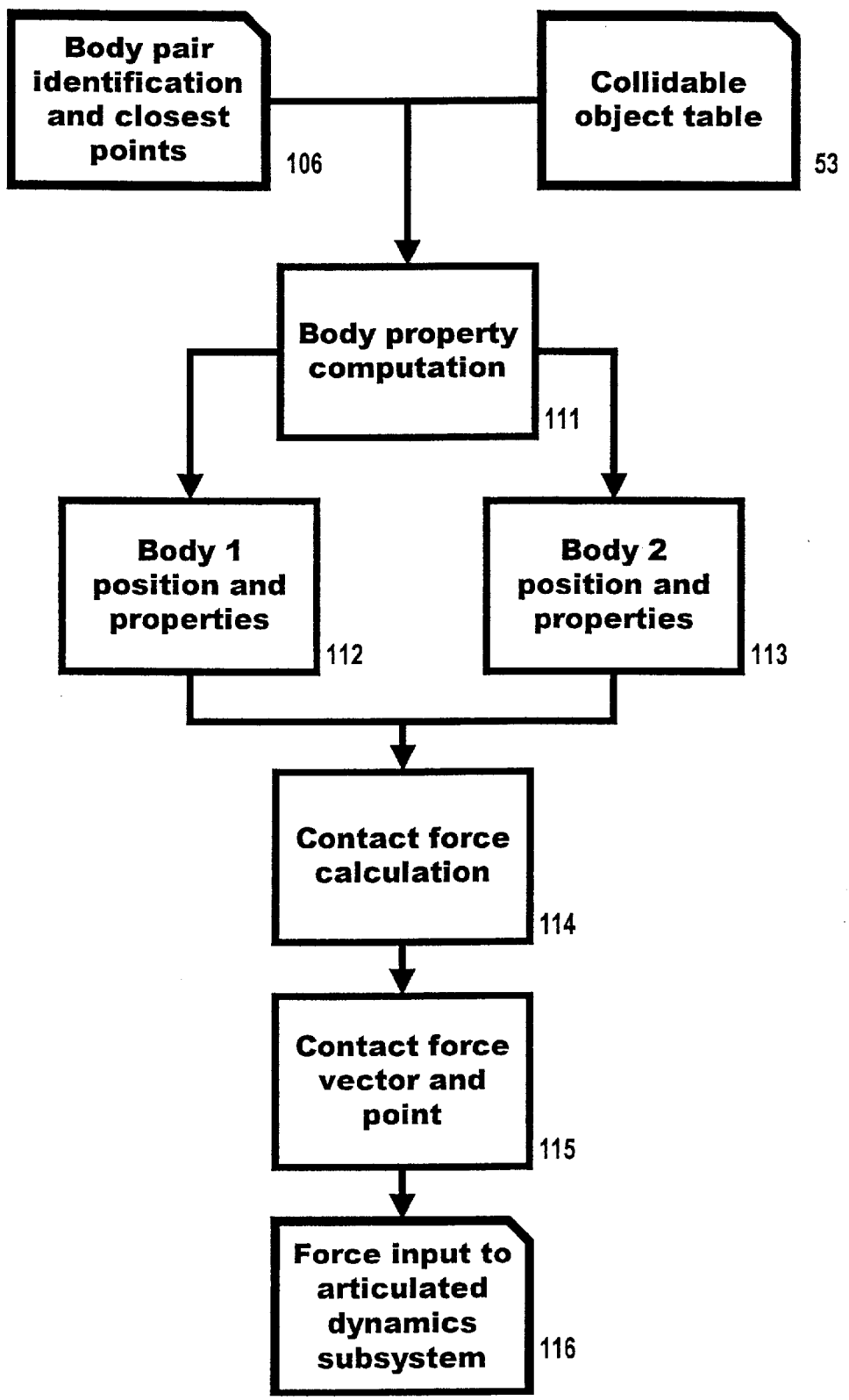
FIG. 13 is a block diagram of the collision response subsystem of the FIG. 4 system.

The collision response subsystem 13, illustrated in FIG. 13, receives the closest-points data developed by the collision detection subsystem 12 and determines the appropriate forces to be applied to the simulated bodies through the articulated dynamics subsystem 14 shown in FIG. 1. For each pair of colliding bodies, a body property computation module 111 collects the information about the bodies from the file 106 and collidable object table 53. The position and properties of a pair of bodies, body 1 and body 2, are computed by body 1 position and properties module 112, and body 2 position and properties module 113, respectively. A contact force module 114 receives information from the modules 112 and 113 and computes the simulated contact force between the two bodies. A contact force vector and contact force point are computed by the module 115 for each body; this data are sent to the articulated dynamics subsystem 14 through a force input file 116.

Figure 14:
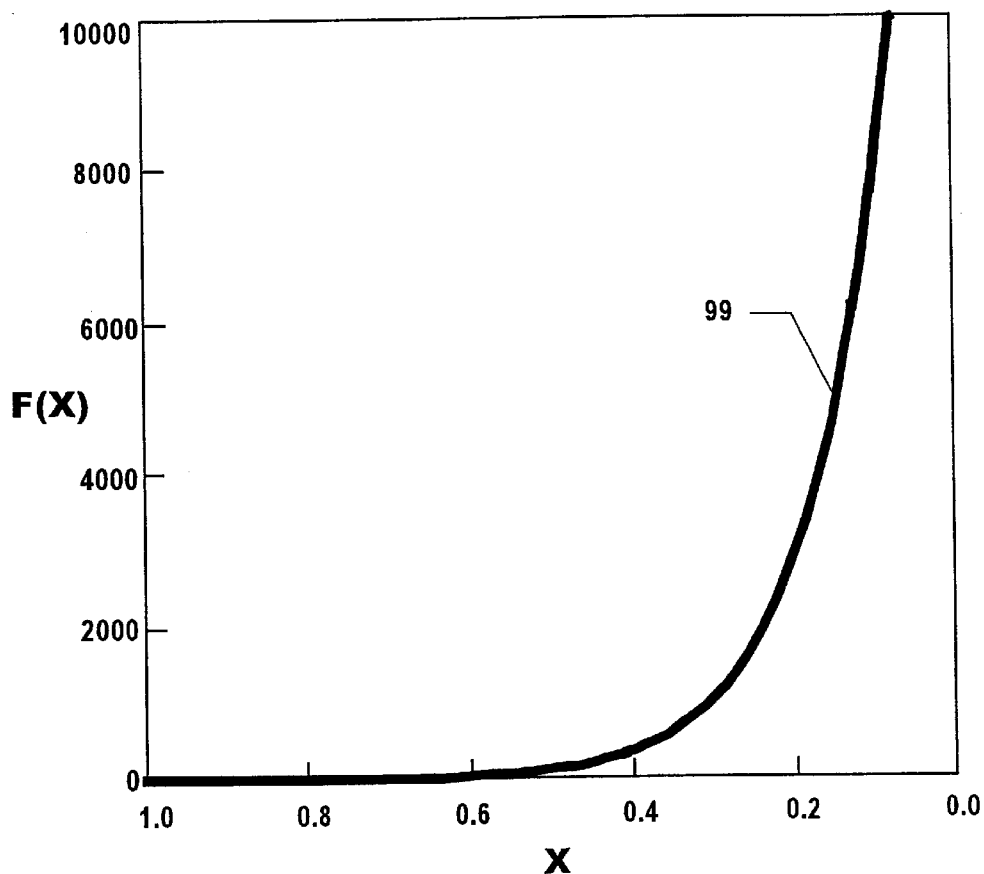
FIG. 14 is a graph of force versus distance between two colliding bodies according to the present invention.

The magnitude of the collision force is computed by the module 114 from the length of the closest-points vector between the two bodies, e.g., vector 90 in FIG. 8C. As shown by the representative curve 99 in FIG. 14, the relationship between the collision force magnitude and the length of the closest-points vector is selected to be nonlinear. The shape of the curve 99 is significant to the working of the present invention; but the scale is for purposes of illustration only.

Previously, a classic Hooke's law spring, with a relationship F=a(c−x), or a classic Roark-type collision model, with a relationship substantially similar to F=a(c−x)$^2$, was typically used. These formulations do not increase sufficiently fast enough to prevent the closest-point distance from going to zero unless the spring constant a is increased to such large values that the resulting forces increase too rapidly for good simulations of small collision forces. Prior art systems typically suffer from numerical instability and excessive numerical stiffness due to this problem. The present invention overcomes this problem.

The best implementation for the present invention is believed to be the relationship:

$$F=ae^{b(c-x)}-d,$$

where a, b, c, and d are constants, x is the length of the closest-points vector, and F is the resulting computed force.

A wide variety of other functions could be used in place of the function above; in particular, a relationship of the form:

$$F=a/(b-x),$$

is also effective. The force between two colliding bodies should increase faster than a linear function, with the increasing force sufficiently large so that, before the length of the closest-points vector goes to zero, the computed force is great enough to overcome the motions causing the collision. The colliding objects come to a stop relative to one another before the closest-point distance goes to zero. The exponential function above is considered optimum because it is scale-independent; the shape of the curve is independent of the magnitude of the forces involved. This makes the overall system self-adjusting with respect to the magnitude of the forces being simulated.

The skin-and-bone model illustrated in FIG. 8C is used to determine the values of the constants a, b, c, and d above. The values are automatically chosen so that the following properties hold:

c is the sum of the "skin thicknesses" of the two colliding objects.

d=1/a, so that when x=c, F=0.

a and b are chosen such that at the point the "bones" just touch, F=Fmax, a value chosen to be so large that no reasonably possible collision can cause forces of that magnitude to be exerted.

a and b are chosen such at the distance where the "skins" are compressed by half their thickness, F=sqrt(Fmax).

Such values provide a well-behaved force/distance curve without the need for manual "tuning" or adjustment of the system, unlike prior art systems.

Joint Limit Subsystem

Figure 15:
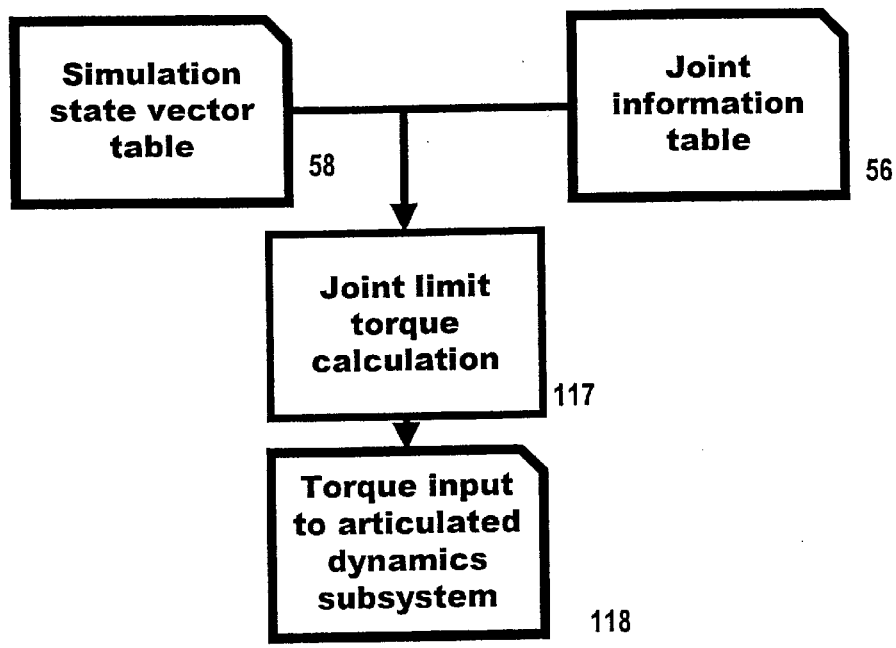
FIG. 15 is a block diagram of the joint limit subsystem of the FIG. 4 system.

FIG. 15 shows the organization of the joint limit subsystem 18 of FIG. 4. The subsystem 18 receives joint angle information and joint angle rate information from the simulation state vector table 58, along with the joint information table 56. Through a joint limit torque calculation module 117, the subsystem 18 determines the appropriate simulated torque to be applied at the joints. The output of the subsystem 18 is a torque value for each degree of freedom of a joint is a torque input file 118. The data in this file are sent to the articulated dynamics subsystem 14 (see FIG. 4), discussed in more detail below.

For the subsystem 18, joint limits are simulated as spring-type limit stops, such as illustrated in FIG. 11, a symbolic representation of a joint. The joint has a moving element 144 which rotates about an axis 148. The rotation is limited by simulated limit stops 141 and 147. When the element 144 reaches an upper rotation limit, which is symbolized by contact with the upper limit stop 141 and indicated by the dotted line 143, a limiting torque is applied against the direction of further rotation. The magnitude of the limiting torque increases as the moving element 144 rotates toward a maximum allowed rotation limit, symbolized by the dotted line 142. Similarly, for rotation in the opposite direction, there is a lower rotation limit indicated by the line 145 at which point of the joint rotation a limiting torque is applied against the direction of rotation. Again, the magnitude of the torque increases as the element 144 moves toward the maximum allowed rotation limit, symbolized by the dotted line 146.

The joint limit torque calculation module 117 determines the limiting torque values in the same manner as linear collisions described above. That is, the relationship between the torque value and the joint angle is nonlinear in accordance with the curve 99 in FIG. 14 with appropriate scaling.

The computations are made in the same manner as described above for the collision response forces, and is effective for the same reasons. This approach to the joint limit springs solves the same problems, e.g., the numerical stiffness of the springs, with regard to simulated linear collision.

Articulated Dynamics Subsystem

Figure 16:
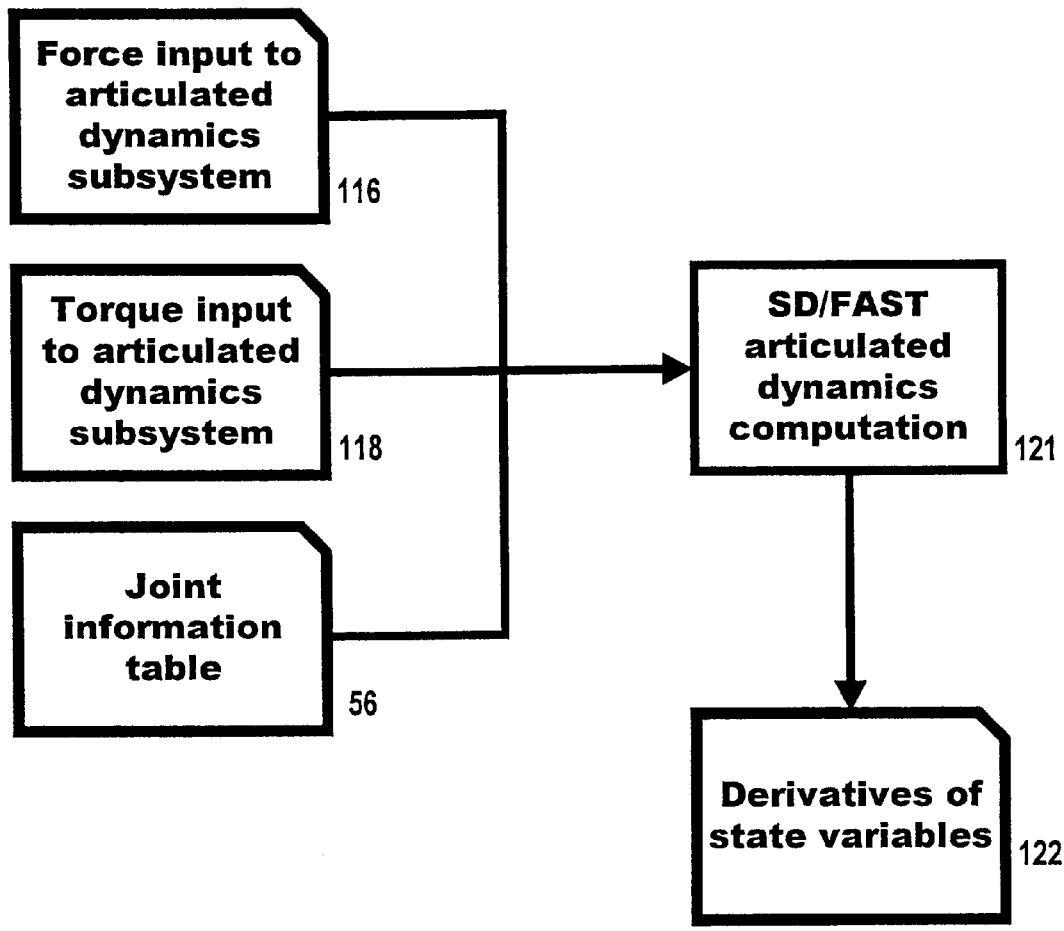
FIG. 16 is a block diagram of the articulated dynamics subsystem of the FIG. 4 system.

As shown in FIG. 16, the articulated dynamics subsystem 14 accepts data computed previously from the force input file 116 of the collision response subsystem 13, from the torque input file 118 of the joint limit subsystem 18, and from the joint information table 56. An articulated dynamics computation module 121 of the subsystem 14 receives these data and attempts to calculate a new set of joint state information in accordance with the laws of physics at a future time interval. The module 121 operates computationally according to a geometrical model defined by the data structures of the force input file 116, torque input file 118, and the joint information table 56. In the present embodiment of the present invention, the computation module 121 is implemented by SD/FAST, a simulation product sold from Symbolic Dynamics, Incorporated, of Mountain View, Calif.

The computation may not always be successful; it may fail for a number of numerical reasons, including overflows and numerical singularities. If such is the case, the failure is signaled through the articulated dynamics subsystem interface 74 (see FIG. 7) and recovery responsibility is handed back to the simulation advance controller 71. On the other hand, if the computation is successful for time interval, the computed data is stored in a derivatives of state variables file 122.

Numerical Integration Subsystem

The numerical integration subsystem 15 computes an updated set of data for the simulation state vector table 58 from the mathematical derivatives of variables in the state variables file 122 of the articulated dynamics subsystem 14. The updated set of data represents a simulation advance by a given time interval. As explained previously, the simulation advances in incremental time intervals.

Figure 17:
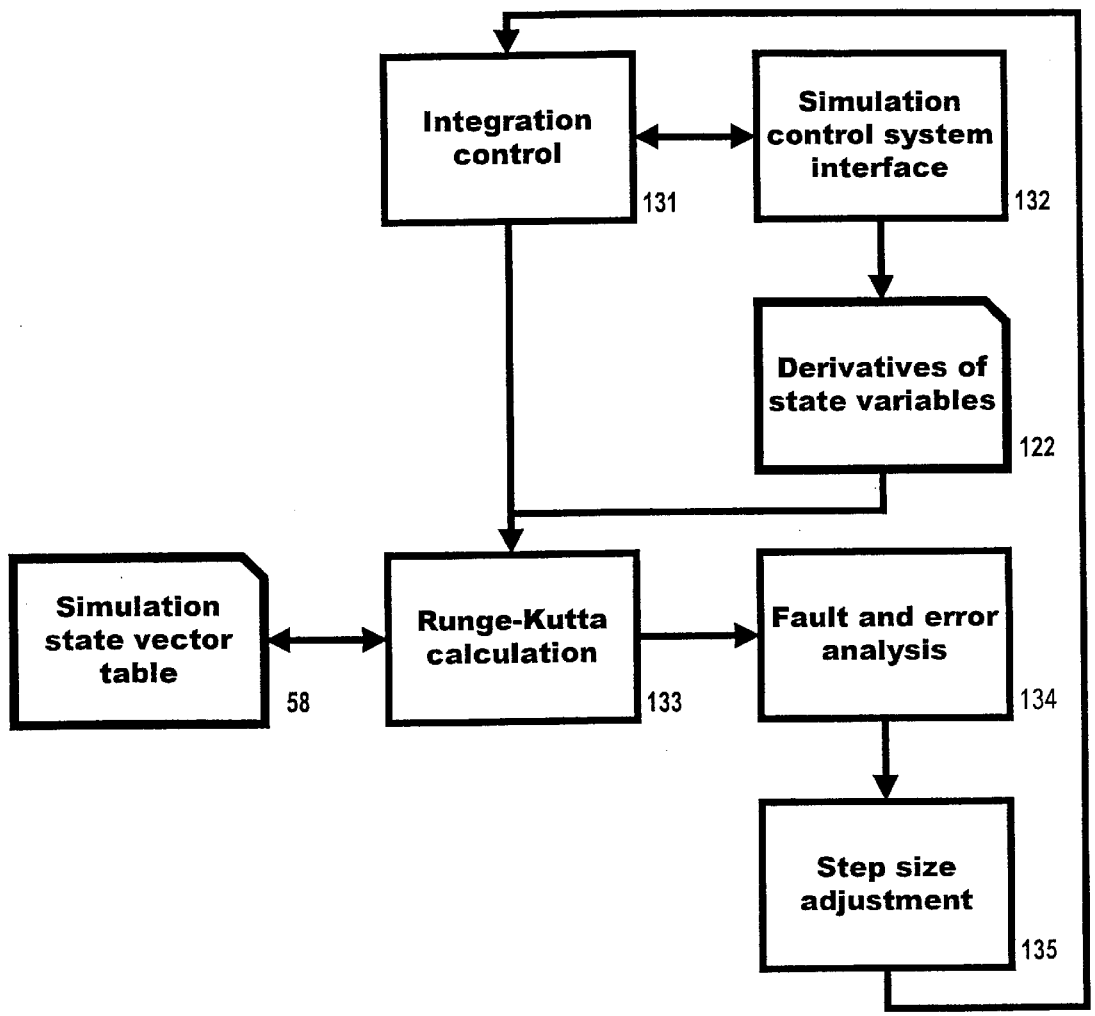
FIG. 17 is a block diagram of the numerical integration subsystem of the FIG. 4 system.

The organization of the subsystem 15 is shown in FIG. 17. An integration control module 131 uses a simulation control system interface 132 to obtain the data from the derivatives of state variables file 122. This data is sent to a Runge-Kutta calculation module 133 which operates upon data from the simulation state vector table 58 for updating. Various computational techniques are suitable for the operation of the module 133: in the preferred embodiment, the well known Runge-Kutta 4 technique with error estimation is used. The module 133 calculates an update of the state vector file 58, or an error or fault condition is generated for a fault and error analysis module 134. The module 134 then passes the information to a step size adjustment module 135 for a new adjusted time simulation increment and the calculations are re-started.

Output subsystem

Figure 18:
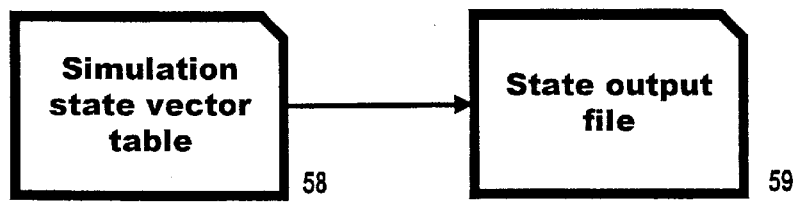
FIG. 18 is a block diagram of the output subsystem of the FIG. 4 system.

The operation of the FIG. 1 output subsystem 16 is illustrated in FIG. 18. As the simulation state vector table 58 is updated at each time, corresponding information, e.g., joint angle and position data, is created for a state output file 59. Typically the state output file 59 is read by a separate computer animation system.

Display subsystem

Figure 19:
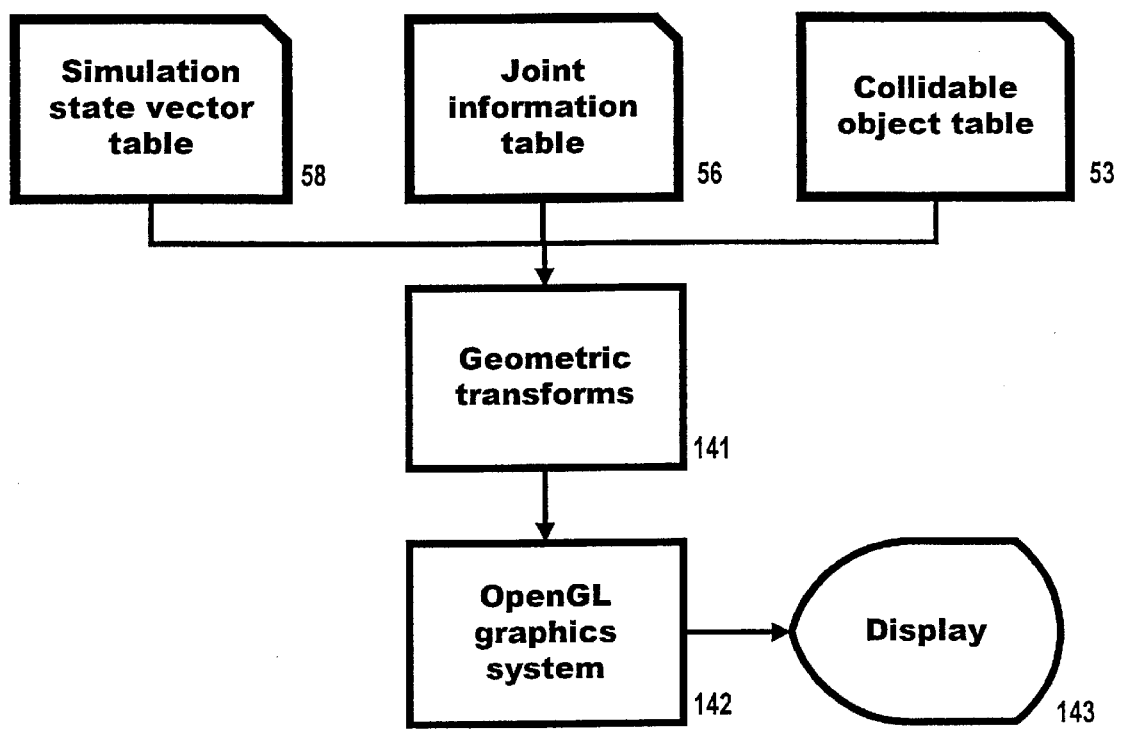
FIG. 19 is a block diagram of the display subsystem of the FIG. 4 system.

The organization of the display subsystem 17, which displays the current positions of all bodies in the simulation, is illustrated in FIG. 19. Data from the simulation state vector table 58, the joint information table 56, and the collidable object table 53 supply the information necessary for a geometric transformation module 141 to generate appropriate geometry for display. The geometrically transformed data is converted into a colored shaded graphical image on a display 143 by a module 142, which implements the widely-used OpenGL (Open Graphics Language), a registered trademark of Silicon Graphics, Inc. of Mountain View, Calif., graphics system.

Process Flow Description

Figure 20:
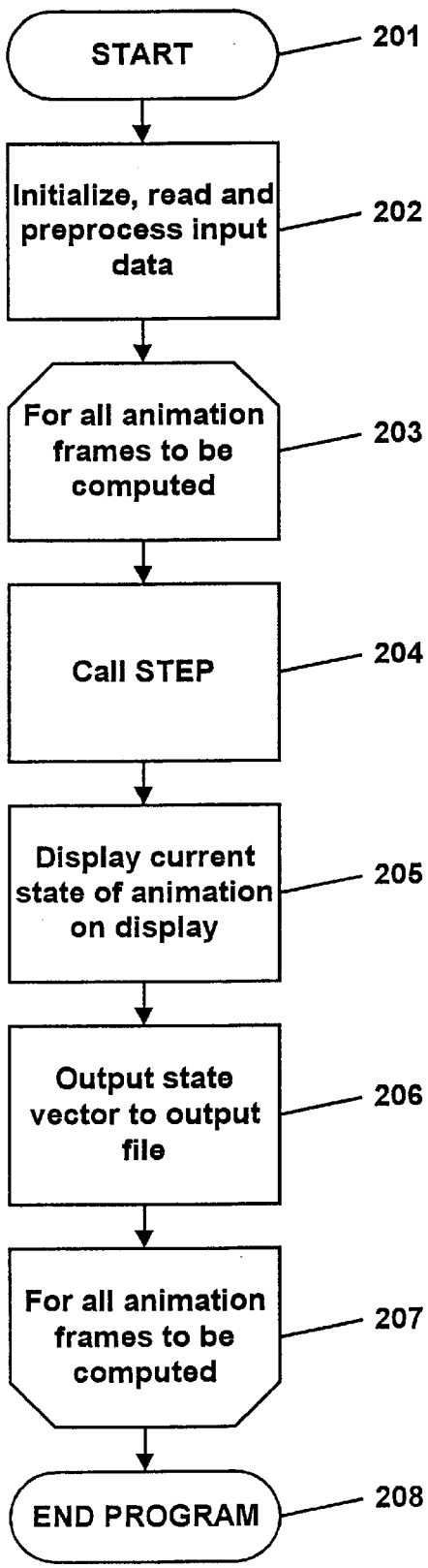
FIG. 20 illustrates the main process flow steps of one embodiment of the present invention.

The flow of the main program is shown in FIG. 20, which corresponds generally to the block diagram of FIG. 4. It should be noted that in this and other process flow drawings, a block having its upper or lower corners cut at a diagonal should be viewed as a bracket, indicative of the beginning or end of a process loop.

Figure 21:
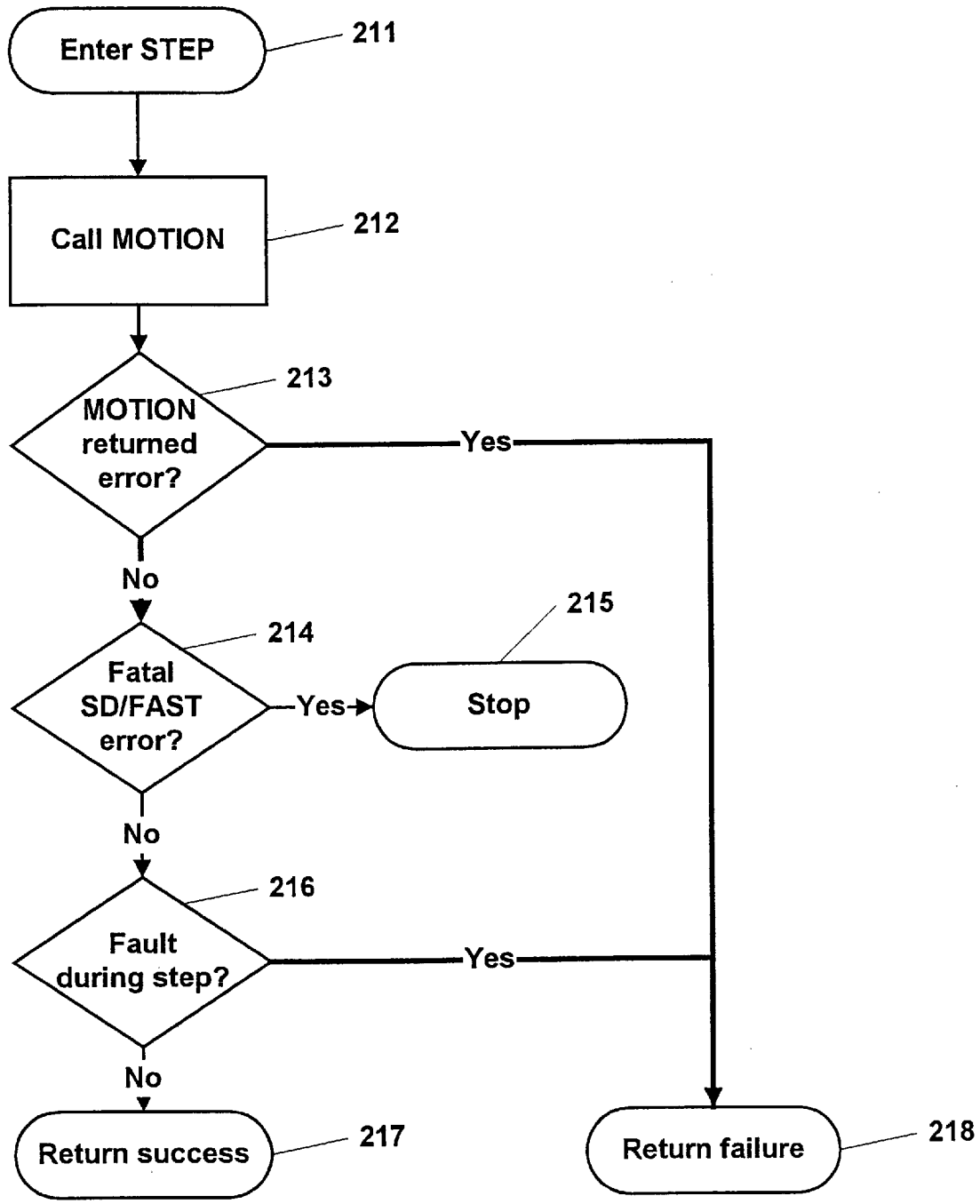
FIG. 21 illustrates the steps of the subroutine STEP.

Entry occurs at step 201. This is followed by an initialization step 202, which involves reading the input files, preprocessing the data, creating and filling in the data structures illustrated in FIGS. 2B–2C and 3B. The main loop of the program comprises the steps 203 through 207 inclusively. The loop is executed once for each animated frame to be produced. Within the loop, the subroutine STEP, described in FIG. 21, is called to perform the simulation computations for the frame. After a return from STEP, the animated character is displayed on a suitable display device (see FIG. 19) in step 205, using standard computer graphics techniques. The data in the simulation state vector file 58 are then appended to the output file 59 (FIG. 18), by which process a file of animation state data for use by an external animation system is accumulated. Upon completion of the desired number of frames, the program terminates at step 208.

The subroutine STEP is shown in FIG. 21. The subroutine is part of the simulation control subsystem 11, as shown in the block diagram of FIG. 4. After an entry step 211, a subroutine MOTION is called at a step 212 to attempt to advance the simulation. Errors detected at this level stop the simulation. Error checks at steps 213, 214, and 216 either stop the simulation immediately at step 215, or return failure at step 218. Such events are rare; the normal case is a return through the step 217.

Figure 22:
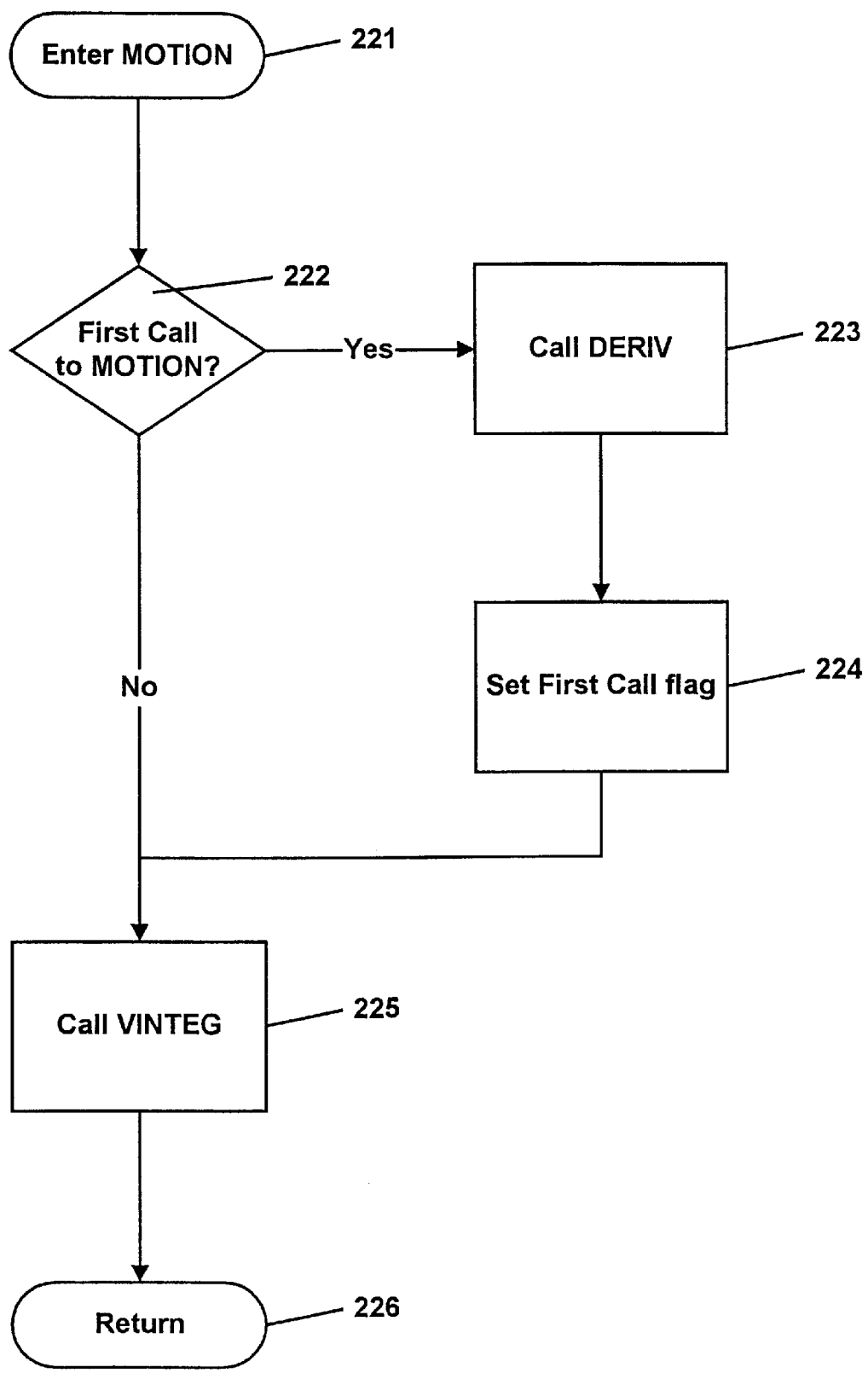
FIG. 22 illustrates the steps of the subroutine MOTION.

The primary function of the subroutine MOTION, which is also part of the simulation control subsystem 11 (shown in FIG. 4) and illustrated in FIG. 22, is to call a variable-step integrator subroutine VINTEG at a step 225. It is necessary to call a subroutine DERIV once to initialize the system after entry step 221, so the test at step 222, the call to DERIV at step 223, and the setting of the First Call flag at a step 224 perform this function. A return occurs at step 226.

Figure 23:
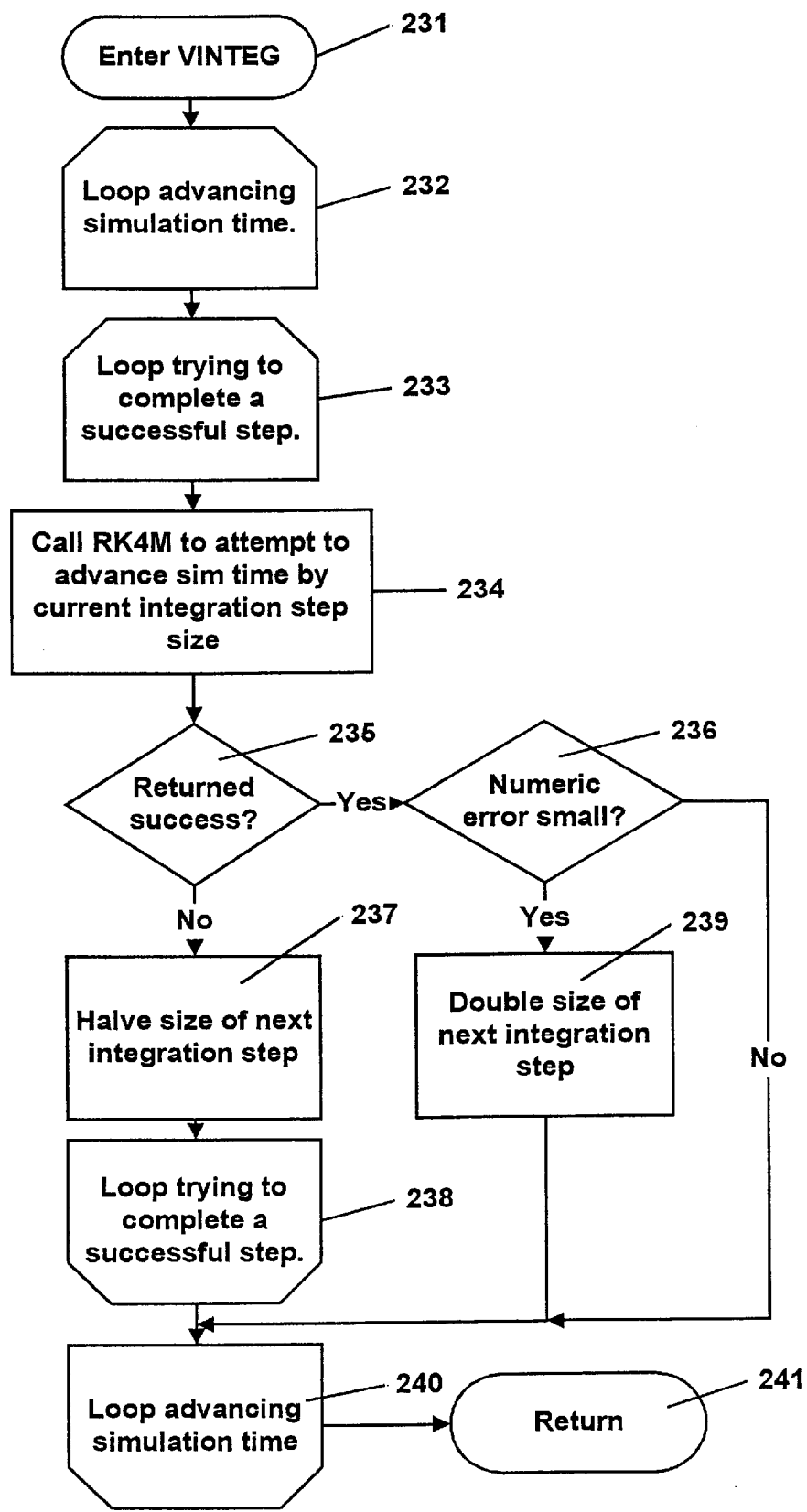
FIG. 23 illustrates the steps of the subroutine VINTEG.

The subroutine VINTEG is shown in FIG. 23. This portion of the system implements a variable-step explicit integrator function according to the well-known "Runge-Kutta-4" algorithm. This subroutine and the RK4M subroutine described below are part of the numerical integrated subsystem 15 of FIG. 4. As described above, in the present embodiment of the present invention, this algorithm is implemented by SD/FAST from Symbolic Dynamics, Inc. of Mountain View, Calif. Other integration algorithms may be used, but the one used here has been found to work well in the present application. After entry at step 231, the subroutine has two nested loops. The outer loop comprises steps 232 through 240 inclusively. Each iteration through that loop advances the computation by one integration step. The size of the integration time step is variable, and is adjusted within the inner loop, which comprises the steps 233 through 238 inclusively. The inner loop first calls the subroutine RK4M, the subroutine implementing the Runge-Kutta algorithm, at step 234, which attempts to advance the simulation by the amount of time specified by the current integration time step.

The RK4M subroutine may be successful or unsuccessful. If RK4M is unsuccessful, the decision step 235 leads to step 237, where the integration time interval is reduced by one-half for the next try. Control then proceeds to the step 238 and loops back to step 233. This is a common event in practice; and typically occurs when the simulation encounters a new event, such as the beginning of a collision. The RK4M subroutine fails repeatedly and the integration time step size is repeatedly halved until an integration step succeeds.

In the case where the RK4M subroutine returns success at the decision step 235, test step 236 is applied to determine whether the worst error value from the RK4M calculation is smaller than a fixed threshold. If the error is small enough, this indicates that the integration step is smaller than it need be, and the time interval is increased for the next iteration at step 239. In practice, this event occurs most often after a collision has been resolved and most of the energy of the collision has been dissipated. The effect of this adjustment and the one described in the previous paragraph is that the simulator slows down when the simulation process encounters difficulties, but accuracy remains constant.

When the RK4M subroutine calculation succeeds, the inner loop 238 is exited and the simulation advances by an integration time step. The outer loop 240 then gets control. If more integration steps are needed to finish the current frame, control returns back to the step 232; otherwise, the VINTEG subroutine returns via a step 241.

Figure 24:
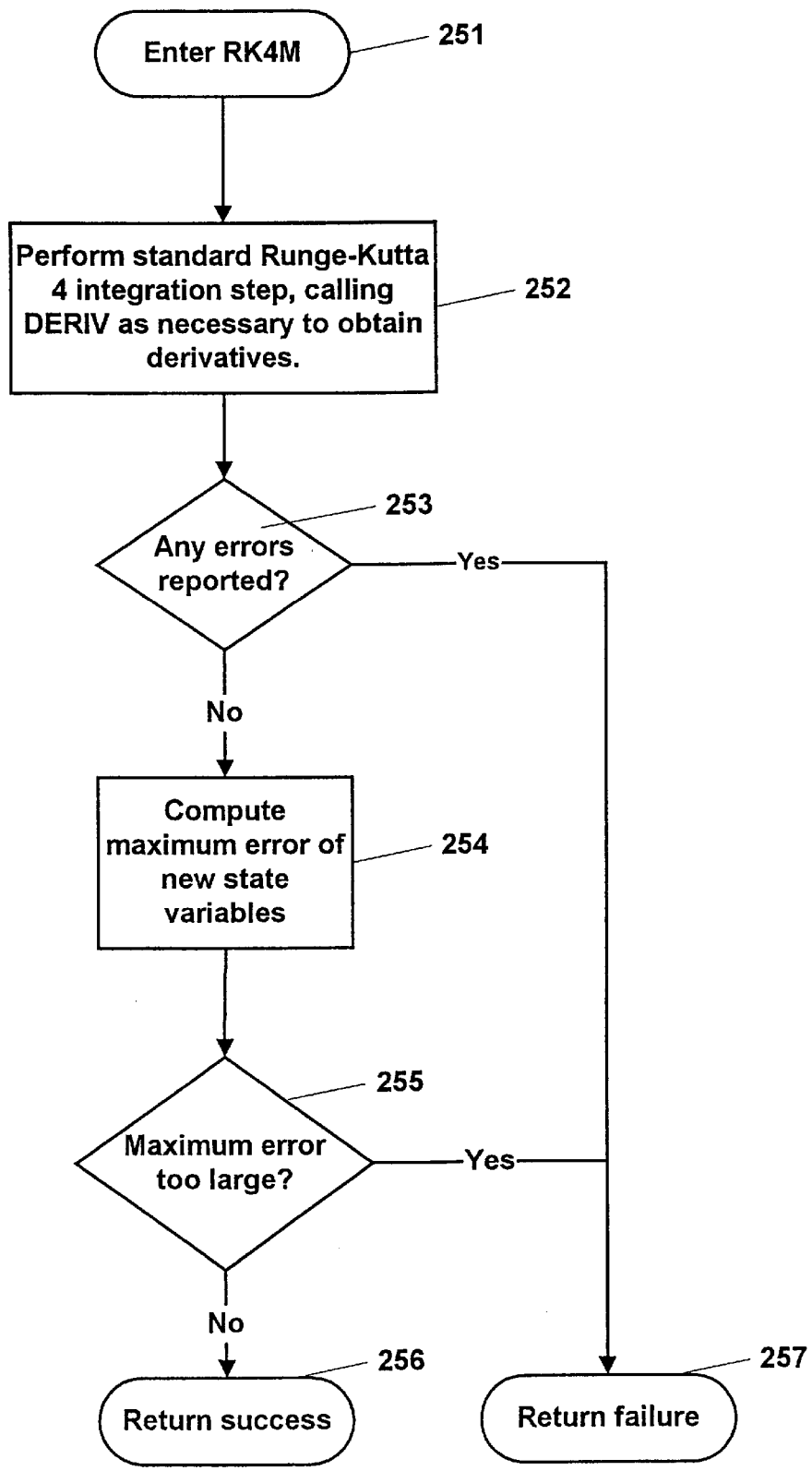
FIG. 24 illustrates the steps of the subroutine RK4M.

The subroutine RK4M is shown in FIG. 24. As explained above, this is a standard piece of mathematical programming, and is documented by Symbolics Dynamics for its SD/FAST program. After entry step 251, the standard RK4M integration step computation is performed at step 252. Decision step 253 tests for any errors from step 252 and return step 257 indicates an error. A multiplicity of error conditions may cause the process flow to take this path, including the list of events given under the heading "Simulation Control Subsystem" above. Much of the robustness of the system of the present invention comes from this error handling procedure.

If no errors are detected at the step 253, the process moves to step 254, where the maximum error for the state variables is computed using a technique known as "Merson error estimation" which is implemented by the SD/FAST program referred to above. If the maximum error exceeds a fixed threshold, the RK4M subroutine flow returns a failure at the return step 257. Otherwise, the RK4M subroutine returns a success at return step 256.

Figure 25:
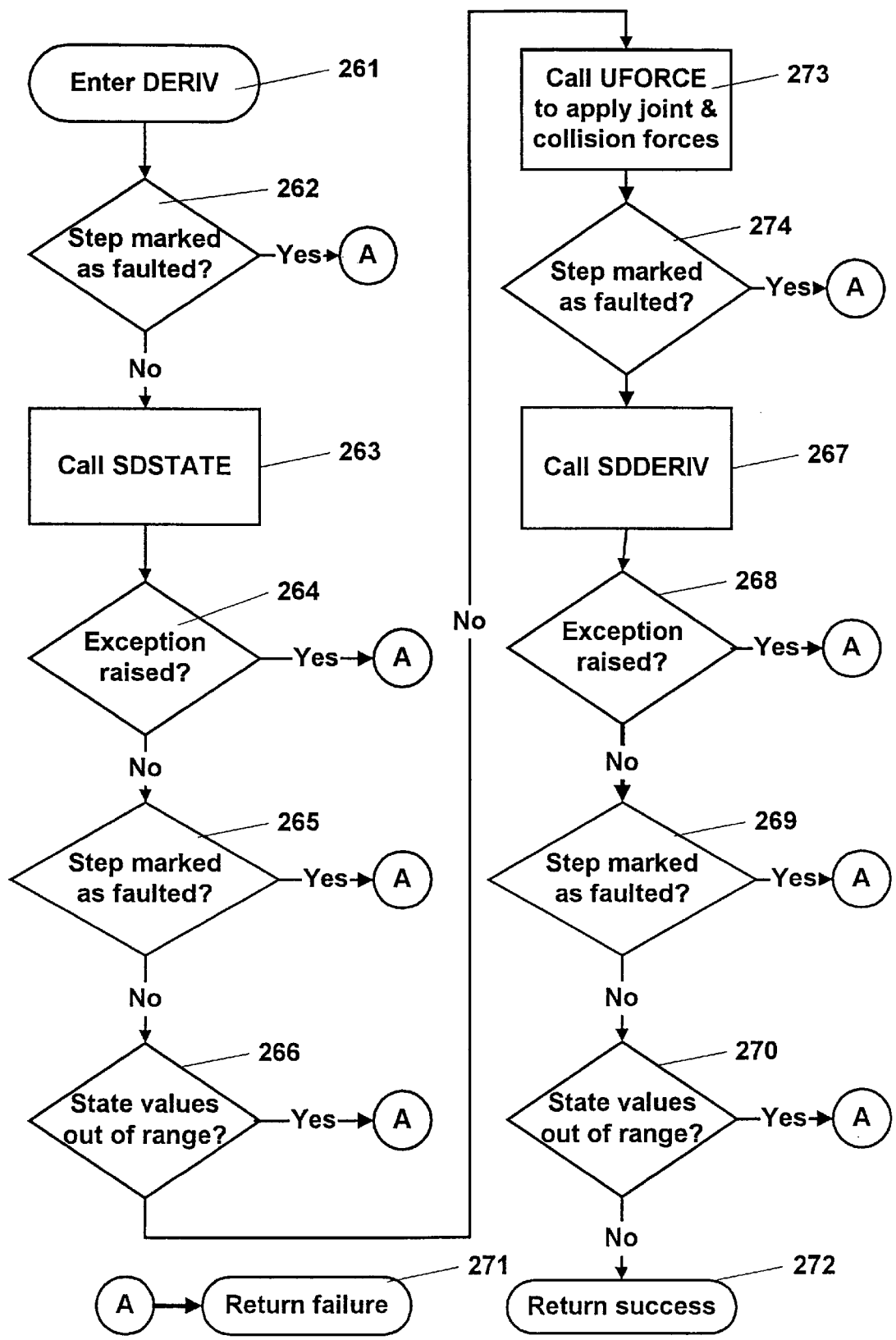
FIG. 25 illustrates the steps of the subroutine DERIV.
Figure 26:
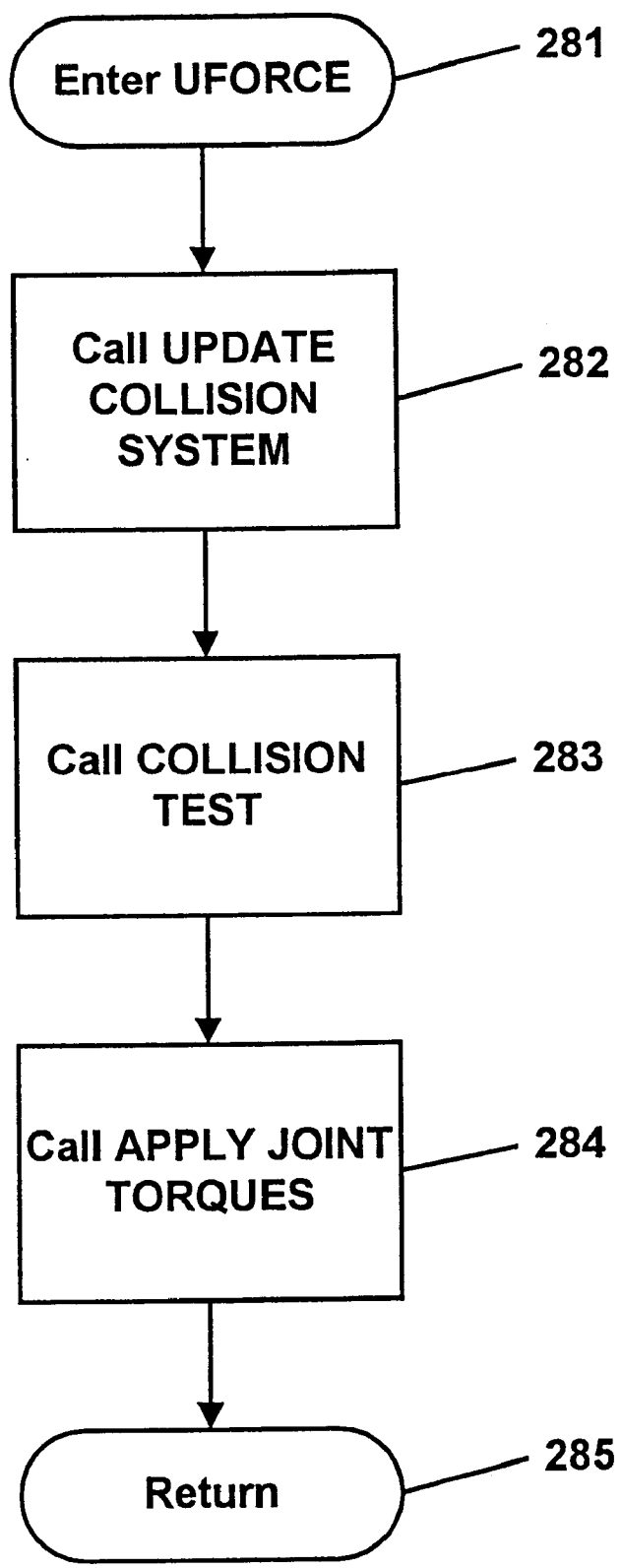
FIG. 26 illustrates the steps of the subroutine UFORCE.

The subroutine DERIV of FIG. 25 is the "user-provided derivative routine" referred to in the SD/FAST program. DERIV calculates the derivatives of variables and has the standard form for such routines, except that more error checking is provided than is usually found in such programs. In the organizational block diagrams, DERIV is part of the simulation control subsystem 11 of FIG. 4 and shown in more detail in FIG. 7. After entry step 261, an immediate check is made at test step 262 to see if the current integration step is marked as faulted, a condition that can be set by a multiplicity of events, such as that of step 215 in the STEP subroutine in FIG. 21. Failure at any point in the DERIV subroutine leads to a failure return step 271, which eventually results in the reduction of the integration time step interval in the VINTEG subroutine at the step 237. A subroutine SDSTATE is called at step 263; this again is part of SD/FAST program mentioned above. Test steps 264, 265, and 266 detect various error conditions, all of which lead to the failure step 271. At step 273, the UFORCE subroutine of FIG. 26 is called to compute and apply the simulated collision forces and joint limit torques. Step 274 checks for any errors reported by UFORCE. An SDDERIV subroutine, also part of the SD/FAST program, is then called at step 267. (All the subroutines beginning with "SD" are part of the SD/FAST program.) As before, steps 268, 269, and 270 test for various error conditions in the results from the SDDERIV subroutine. An error condition at any of the test steps 268, 269, and 270 again lead to the failure return step 271. If there are no failure conditions at any of the test steps 262, 264, 265, 266, 268, 269 and 270, the DERIV subroutine leaves by a success return step 272. The many error checks describe here are part of the improvements of the present invention, the result of which is more robust simulations than is found in the prior art.

The subroutine UFORCE, which is shown in FIG. 26, has overall control of the application of simulated forces and torques required to simulate the animated character and its interactions with its environment. UFORCE corresponds to organizational blocks 72 and 73 in FIG. 7. After entry step 281, processing begins by calling an UPDATE_COLLISION_SYSTEM subroutine at a step 282, which updates the positions of all bodies involved in the simulation. Once the body positions in the simulation have been updated, a COLLISION_TEST step 283 queries whether any bodies contact each other in the updated positions from the step 282 and handles such contacts, i.e., collisions. After the collisions between bodies are handled, the checking of joint limits and the application of joint torques implied by joint limits are performed at APPLY_JOINT_TORQUES step 284. The UFORCE subroutine then returns by step 285.

Figure 27:
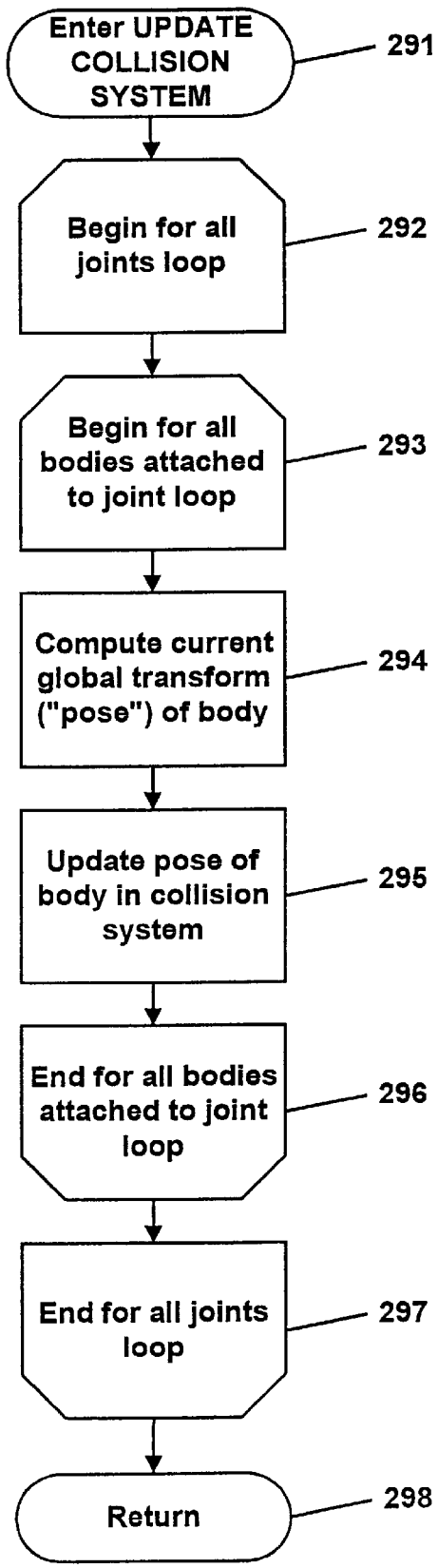
FIG. 27 illustrates the steps of the subroutine UPDATE_COLLISION_SYSTEM.

The UPDATE_COLLISION_SYSTEM subroutine is shown in FIG. 27. This subroutine is part of the collision detection subsystem 12 in FIG. 4 and corresponds to the block diagram of FIG. 12. As explained above, this subroutine updates the data structures of the collision detection system based on the current data of the simulation state vector table 58. After entry step 291, the subroutine has an outer loop comprising steps 292 through 297 inclusively which iterates over all the joints of the simulation, and an inner loop comprising steps 293 through 296 inclusively which iterates over all the bodies attached to each joint. For each body, the current position and orientation of the body, (here called a "pose") is expressed as a 4×4 transformation matrix using the facilities of SD/FAST program by step 294. The pose of the body is then updated in step 295, which implements the techniques described in the previously cited and incorporated article, "I-COLLIDE: An Interactive and Exact Collision Detection System for Large-Scaled Environments ," by J. Cohen, M. Lin, D. Manocha, and K. Ponamgi, *Proceedings of ACM Int. 3D Graphics Conference*, 1995, pp. 198–196. Once all joints and bodies have been processed, the subroutine returns via a step 298.

Figure 28:
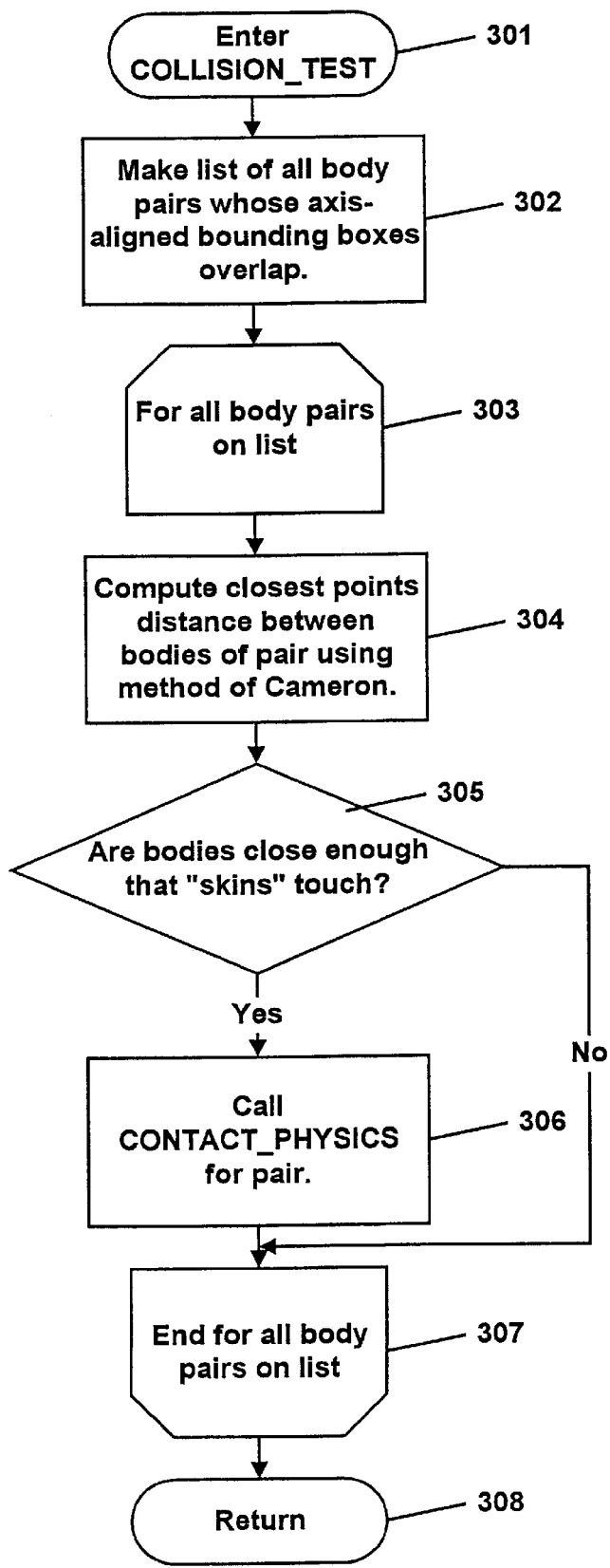
FIG. 28 illustrates the steps of the subroutine COLLISION_TEST.

The COLLISION_TEST subroutine called by step 283 in the UFORCE subroutine (FIG. 26) is shown in FIG. 28. This subroutine corresponds to the body pair closest points computation subsystem 105 in FIGS. 12 and 13. After entry step 301, a list of body pairs whose axis-aligned bounding boxes overlap is constructed in a step 302, using the method taught in the previous cited article by J. Cohen et al. Thus the list contains all the body pairs which could potentially be in contact. The step 302 is an optimization; if all possible body pairs were examined, the result would be the same, but the computation would be far slower. Note that the bounding boxes described with respect to FIG. 6B are with reference to the skin polyhedron, e.g., the skin 82 in FIG. 8A. Steps 303 through 307 iterate over the list to examine all the body pairs potentially in contact. A technique described by the previously cited and incorporated article, "Enhancing FJK: Computing Minimum and Penetration Distances between Convex Polyhedra," by S. Cameron, *Int. Conf. Robotics and Automation,* April 1997, is used at step 304 to compute the two closest points, one on each body, for the body pair being tested. Unlike step 302, bone polyhedra are used here, e.g., the bones 86 and 88 of the bodies 84 and 85 respectively in FIG. 8C, so that the distance between the two closest points is the distance between the bones.

The thickness of the skin of each body is a constant, so the test at step 305 is made by comparing the distance between the closest points of the bodies (e.g., points 78 and 79 in FIG. 8C) with a known constant. If the two bodies of the pair are far enough apart so that the "skins" do not touch, there can be no contact forces, and the process flow skips to step 307. This situation occurs whenever the axis-aligned bounding box test at the step 302 finds an overlap, but the bodies involved are not, in fact, close enough to touch. For the body pairs which are in contact, a subroutine CONTACT_ PHYSICS is called at step 306 to calculate the appropriate forces. Once all body pairs have been processed, the COLLISION_TEST subroutine returns via step 308.

Figure 29:
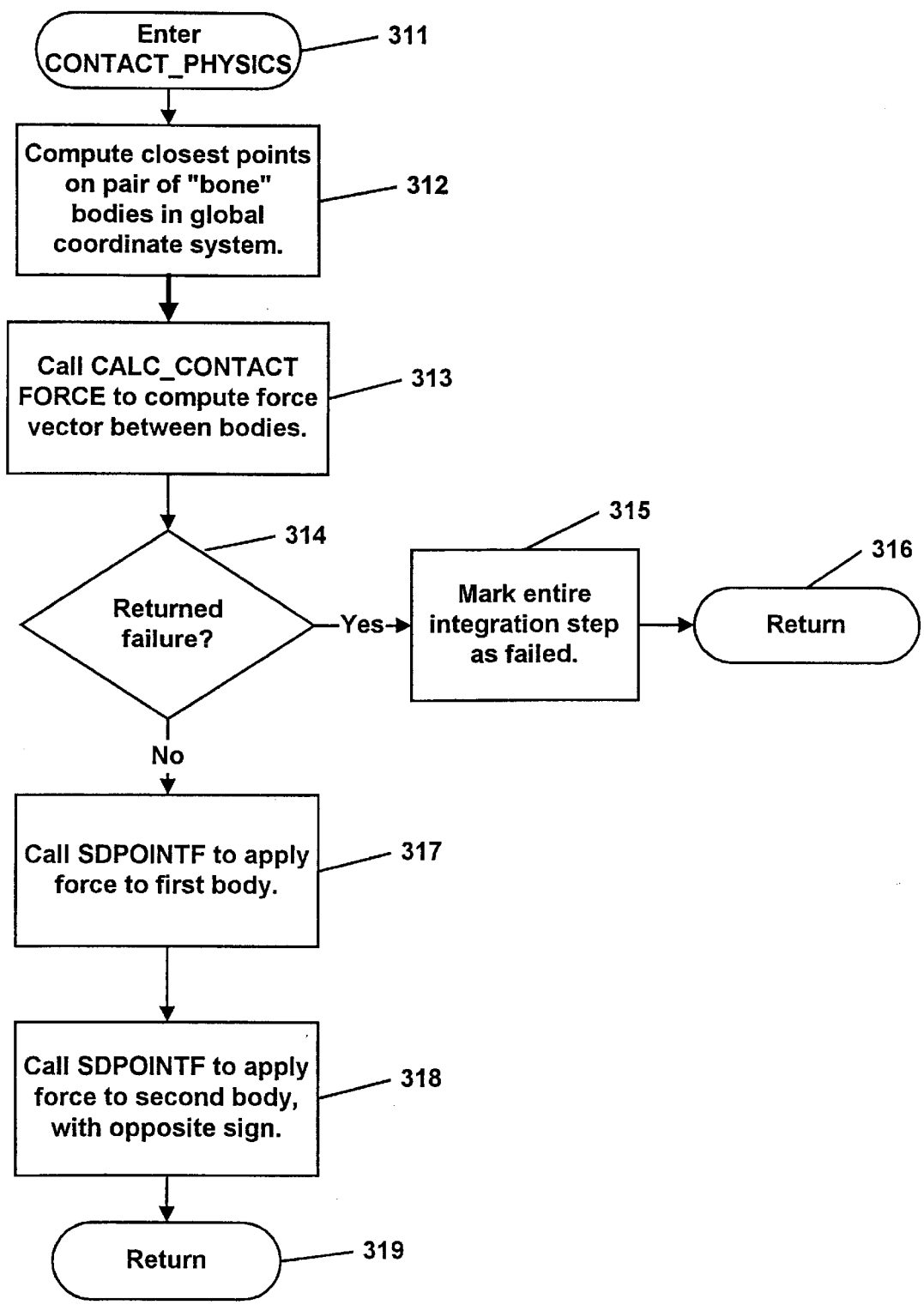
FIG. 29 illustrates the steps of the subroutine CONTACT_PHYSICS.

The subroutine CONTACT_PHYSICS, part of the contact force calculation subsystem 114 of FIG. 13, is shown in FIG. 29. After entry step 311, step 312 computes the "closest points" on the bones of the colliding bodies (points 78 and 79 on the bone polyhedra 88 and 86 of the bodies 85 and 94 respectively exemplary FIG. 8C) in the global coordinate system. This step 312 uses the information previously computed by the method in the step 304 from the COLLISION_ TEST subroutine in FIG. 28. With the closest points information available, a subroutine CALC_CONTACT_ FORCE is called at step 313 to compute the magnitude and direction, expressed as a vector in three dimensions, of the force acting between the bodies in contact. The computation by the CALC_CONTACT_FORCE subroutine may fail, in which case a failure test step 314 directs the process flow through a marking step 315 and a failure return step 316. The CONTACT_PHYSICS subroutine has failed. If the computation at step 313 is successful, the test step 314 directs the flow to step 317, where the function SDPOINTF, part of SD/FAST, is called to apply the force to one of the bodies. Similarly, at following step 318, the same force is applied, with opposite sign, to the other body involved in the collision. Finally, CONTACT_PHYSICS returns at step 319.

Figure 30:
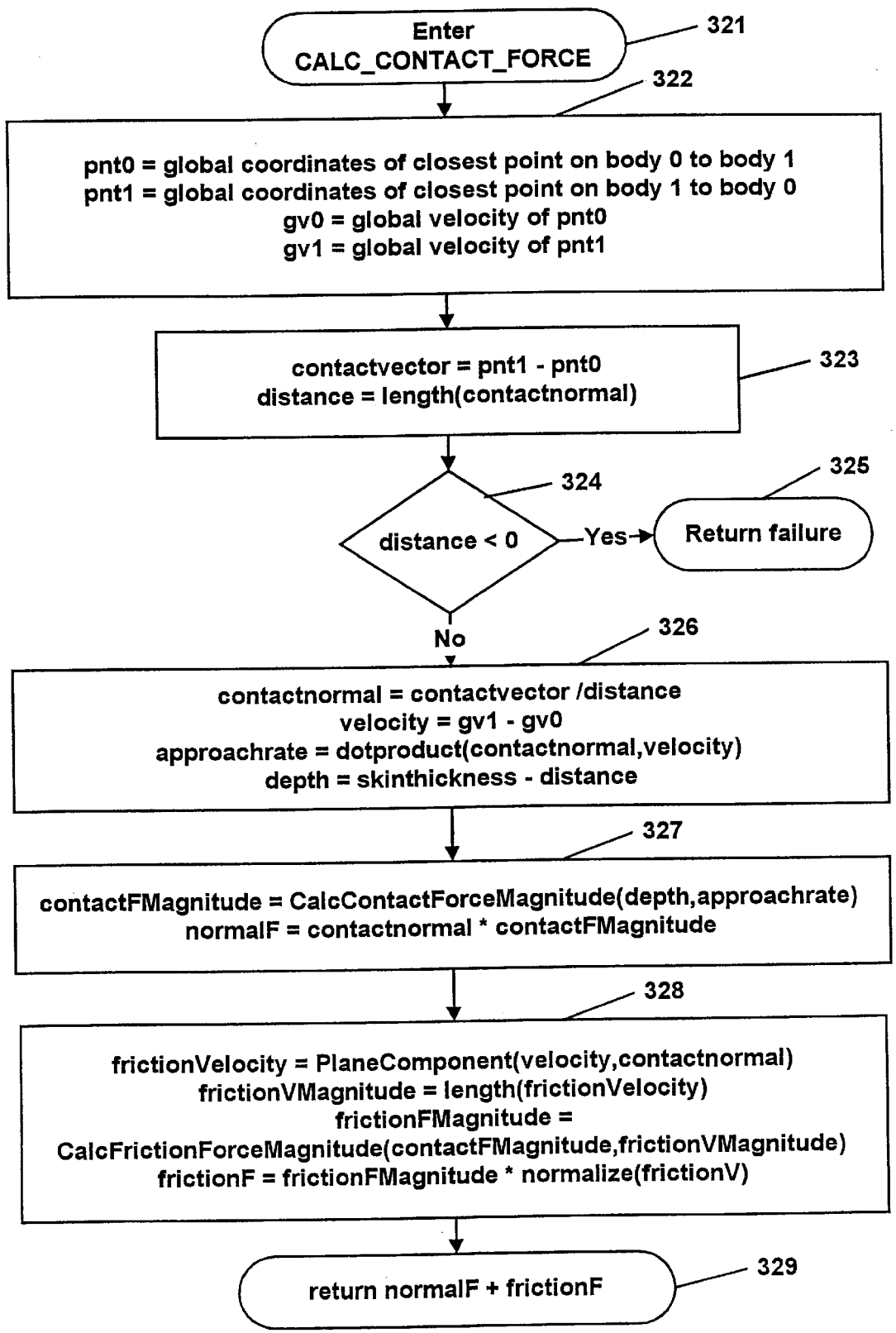
FIG. 30 illustrates the steps of the subroutine CALC_CONTACT_FORCE.

The subroutine CALC_CONTACT_FORCE called at step 313 above is shown in FIG. 30. This subroutine is also part of the contact force calculation subsystem 114 of FIG. 13. The detailed computations in this subroutine are of interest. After entry step 321, definitional "step" 322 shows the meanings of the significant variables involved in the computation. Step 323 computes the contact normal, the unit vector between the bodies in contact which indicates the direction in which contact forces are applied, and the distance between the closest points on the bone polyhedra of the bodies. At step 324, a check is made to insure that the distance between the bone polyhedra is positive. A zero or negative distance indicates bone-to-bone contact, which is not permitted. Such an occurrence indicates that the integration step is too big, and the process moves to failure return step 325. In due course the computation is retried with a smaller time interval step.

If the distance is positive at step 324, the process proceeds to step 326, where the unit normal of the contact vector and the approach rate between the two bodies are computed for use in the computation of elastic contact forces. At step 327, subroutine CALC_CONTACT_FORCE_MAGNITUDE is called for the determination of the magnitude of the contact force, and that magnitude is multiplied by the contact normal to compute the normal component of the contact force. At following step 328, the frictional force between the bodies is computed. PLANE_COMPONENT is simply the vector cross product of two vectors. Finally, at step 329, the vector sum of the normal and frictional forces is computed and the process returned. The force acting between the two bodies has been determined for this time interval.

Figure 31:
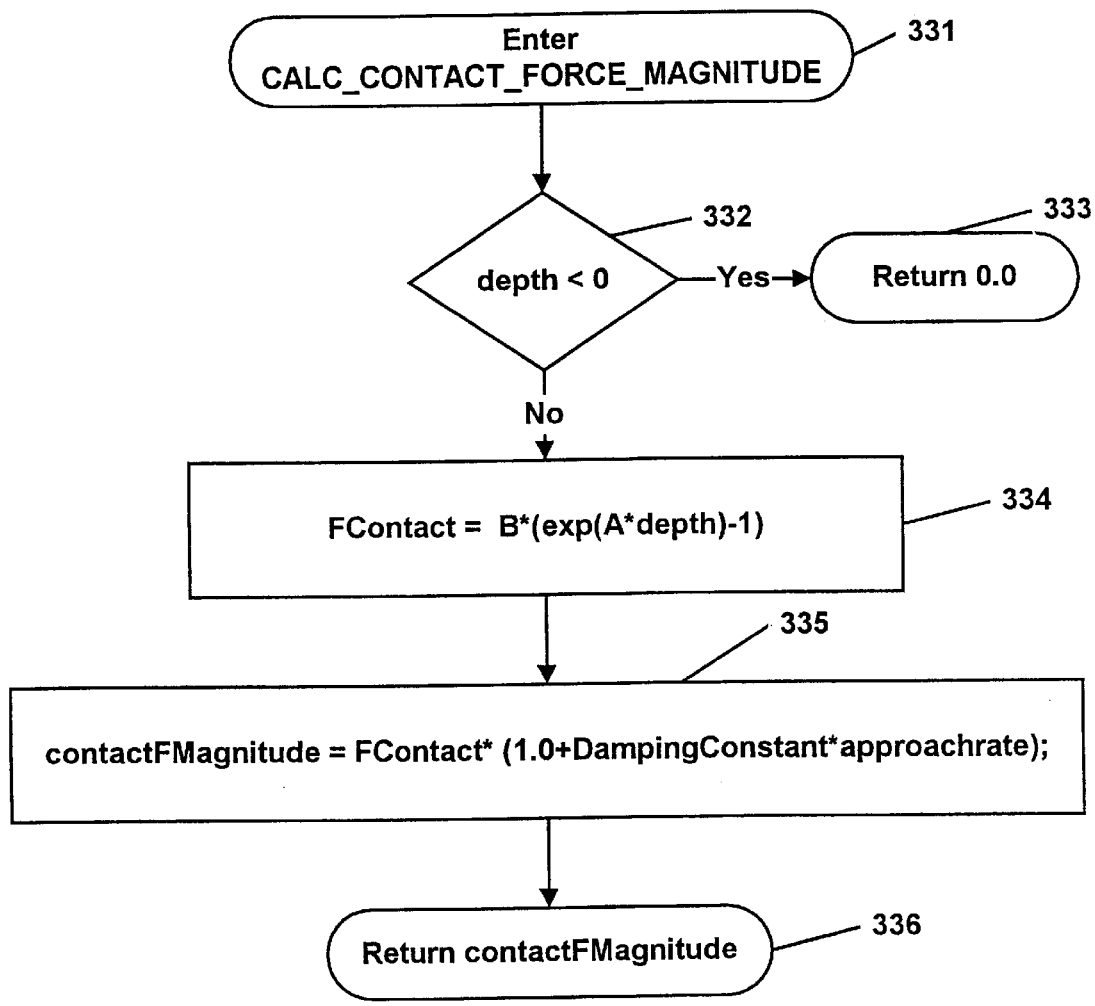
FIG. 31 illustrates the steps of the subroutine CALC_CONTACT_FORCE_MAGNITUDE.

The subroutine CALC_CONTACT_FORCE_ MAGNITUDE called at step 327 above is shown in FIG. 31. This subroutine is also part of the contact force calculation subsystem 114 of FIG. 13. This implements the novel contact force model according to the present invention. After entry step 331, there is a check for a negative contact depth at test step 332. A negative contact depth indicates that the bodies are not in contact at all. In such cases, the process moves to return step 333 by which the value 0.0 is returned. If there is contact, step 334 implements the "exponential spring" model described above under the "Collision Response Subsystem" heading and illustrated in FIG. 14. The expression, "exp", as used here is simply the mathematical function, ex. At following step 335, the damping term is applied to the contact force. Note that damping is multiplied by the contact force, rather than added to it. This is deliberate; it is not only physically reasonable, but makes this part of the system self-tuning, in that damper strength need not be manually adjusted to compensate for the mass of the bodies. Finally, at a step 336, the contact force vector is returned.

Figure 32:
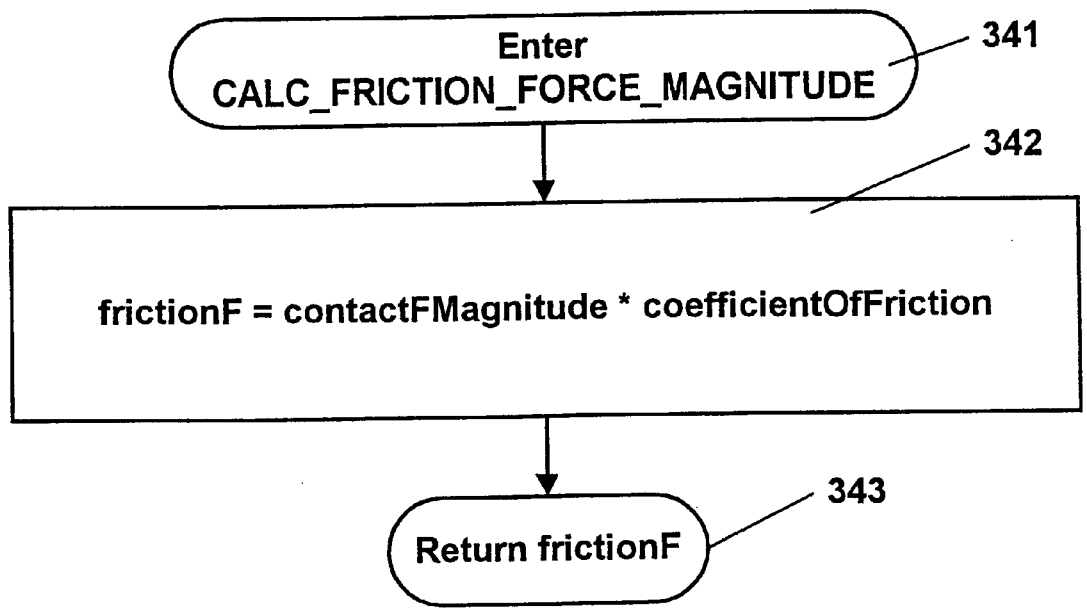
FIG. 32 illustrates the steps of the subroutine CALC_FRICTION_FORCE_MAGNITUDE.

The subroutine CALC_FRICTION_FORCE_ MAGNITUDE, part of the contact force calculation subsystem 114 of FIG. 13, called in step 328 is shown in FIG. 32. This subroutine computes the frictional force straightforwardly. Only one coefficient of friction is used. Alternatively, separate values for static and dynamic friction can also be used, but have not been found necessary for present animation work. The process enters at step 341 and a simple friction value is computed at step 342. The magnitude of the friction force is returned at 343.

Figure 33:
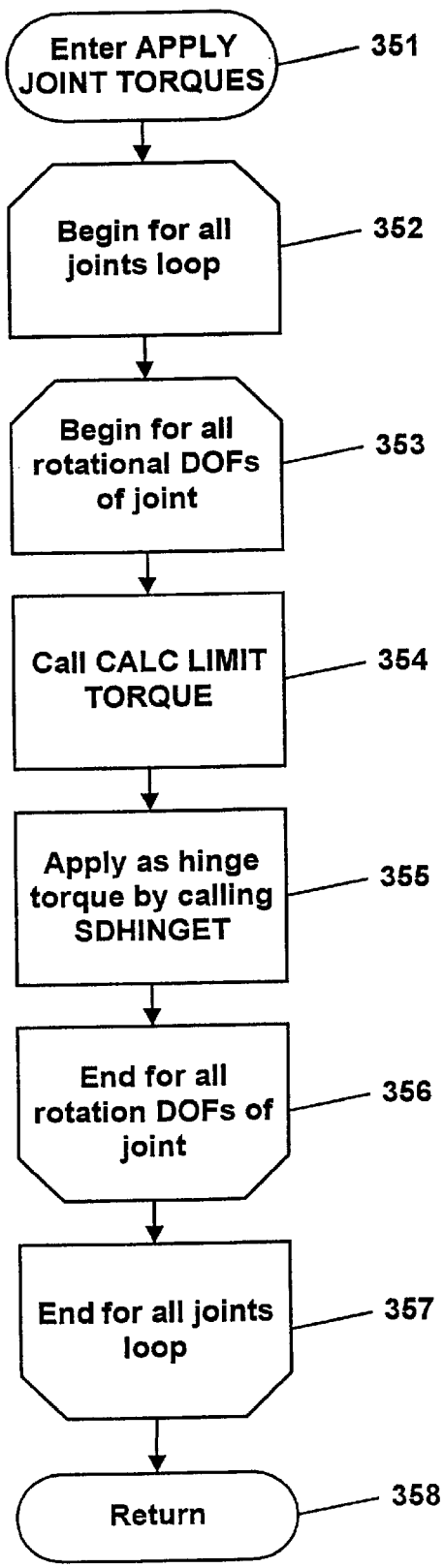
FIG. 33 illustrates the steps of the subroutine APPLY_JOINT_TORQUES.

The subroutine APPLY_JOINT_TORQUES is shown in FIG. 33. In the block diagram of FIG. 4, this subroutine is part of the joint limit subsystem 18. This subroutine simulates the action of rotation limit stops for each joint, by computing torques as if each limit stop were composed of a spring and a damper, as explained previously. After entry step 351. there is a main loop comprising steps 352 through 357 inclusively, which iterates through all joints of the characters being animated. An inner loop comprising steps 353 through 356 inclusively iterates over all the rotational degrees of freedom of each joint. Thus, for each rotational degree of freedom of the system, the subroutine CALC_ LIMIT_TORQUE is called at a step 354 to compute the limit stop torque, if any, for the joint, after which the subroutine SDHINGET (part of SD/FAST system) is called at a step 355 to apply the simulated torque to the relevant joint.

Figure 34:
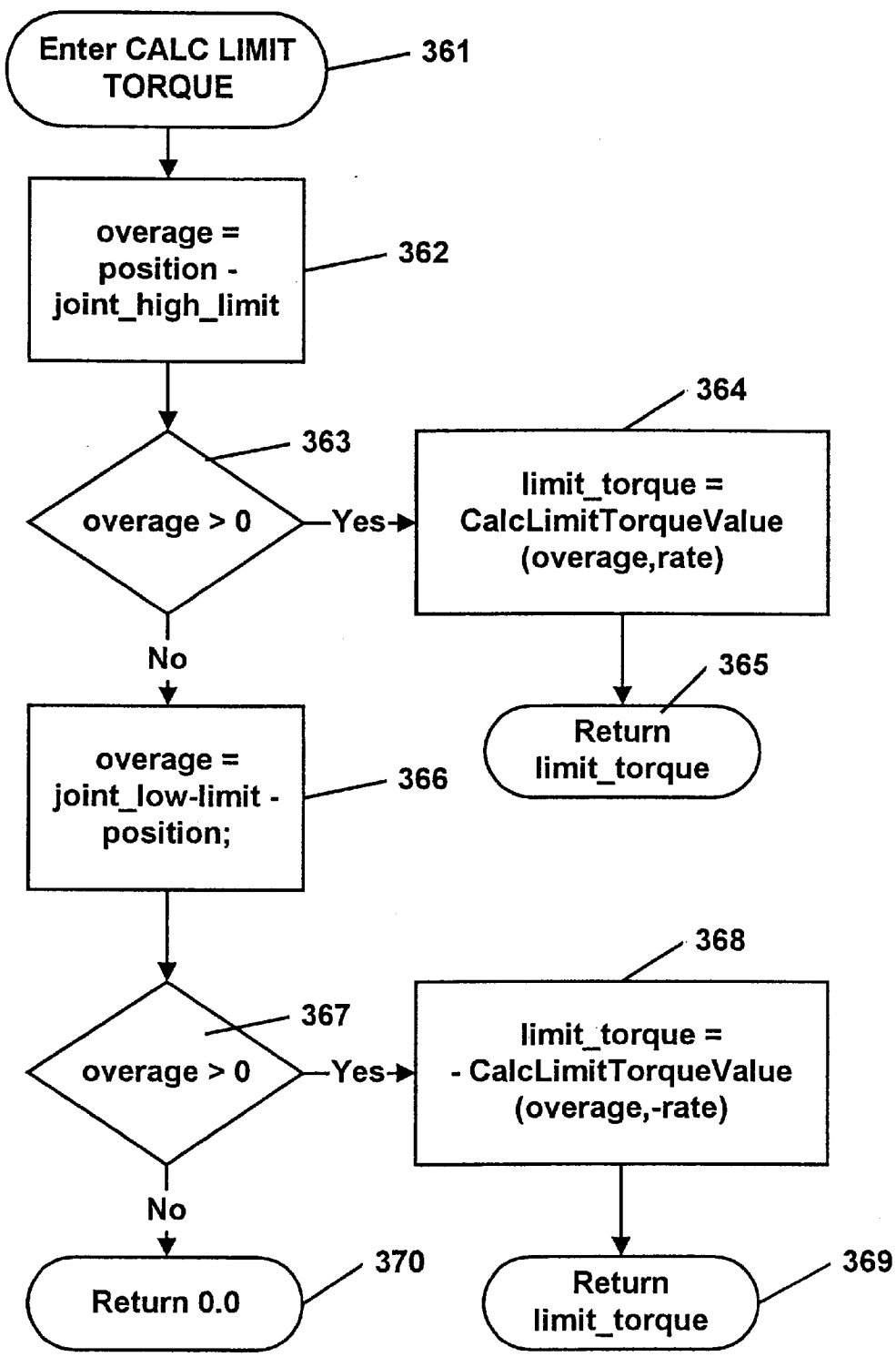
FIG. 34 illustrates the steps of the subroutine CALC_LIMIT_TORQUE.

The subroutine CALC_LIMIT_TORQUE is shown in FIG. 34. This subroutine calculates the torque against further rotation by the limit stops of a single rotational degree of freedom of a joint. After entry step 361, step 362 determines the angle overage by which the joint position is past its high limit. If the overage is greater than zero, determined by test step 363, there is a branch to step 364 by which a CALC_LIMIT_TORQUE_VALUE subroutine is called to compute the appropriate simulated torque for the limit stop. After the determination of step 364, the process returns to step 354 in the APPLY_JOINT_TORQUES subroutine by return step 365.

If the joint is not past the high limit, there is a branch from step 363 to step 366 which determines the angle overage by which the joint position is past its low limit. A test step 367 whether the angle overage in this case is greater than zero. If such is the case, step 368 determines the appropriate simulated torque for the low limit stop through the CALC_LIMIT_TORQUE_VALUE subroutine and the process returns to step 354 by return step 369. If the joint is between its limit stops, the normal case, a torque of 0.0 is returned by step 370.

Figure 35:
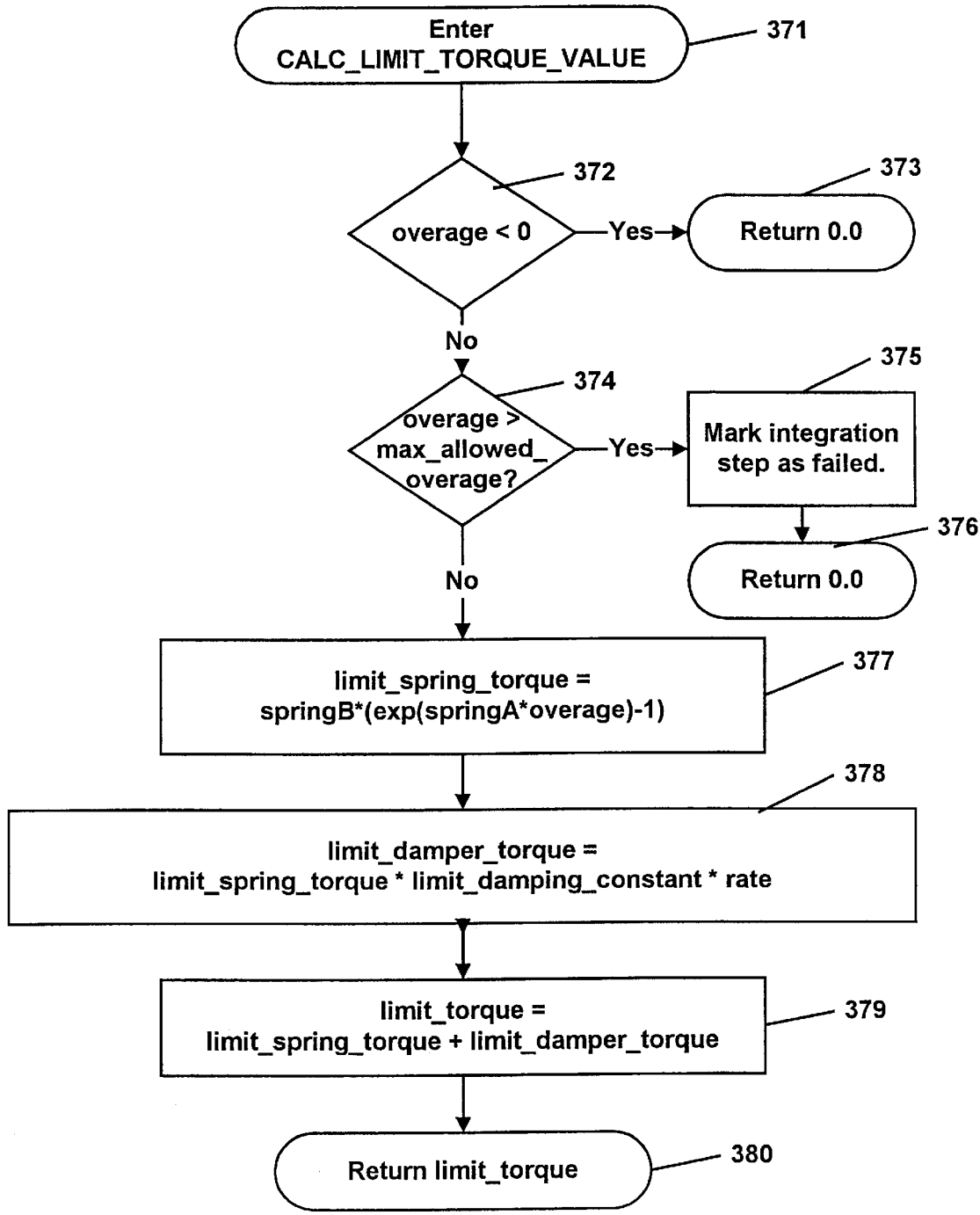
FIG. 35 illustrates the steps of the subroutine CALC_LIMIT_TORQUE_VALUE.

The subroutine CALC_LIMIT_TORQUE_VALUE called in step 368 performs a novel computation of joint limit forces, as discussed previously in the section titled, "Joint Limit Subsystem." The steps of the subroutine is shown in FIG. 35. Entry to this subroutine is by a step 371. At next step 372, the angle overage for the limit stop is tested. If the overage is negative, i.e., the joint has not reached that limit stop, and the value 0.0 is returned at step 373. If the overage is zero or greater than zero, step 374 tests whether the overage is excessive (2 degrees is the usual limit used). If so, step 375 marks the entire integration step as failed and the process moves to return step 376. This event typically occurs when the integration time interval is too large and extrapolation by the integrator has let to an unreasonably large value.

If the overage is not excessive, i.e., the joint is in its normal limit stop region, the process reaches step 377 and a non-zero limit spring torque is computed. Note the exponential spring computation, which is similar to that used for contact forces in the step 334. The explanations of both exponential spring computations are covered in the discussion in the section "Collision Response Subsystem" above. Thus, joint limits are treated much like a spring/damper limit stop device, such as a common door closer. As in the collision calculation steps, there is a damping term which is computed in next step 378. The spring and damping terms are added in step 378, and the process returns in step 380.

Figure 36A:
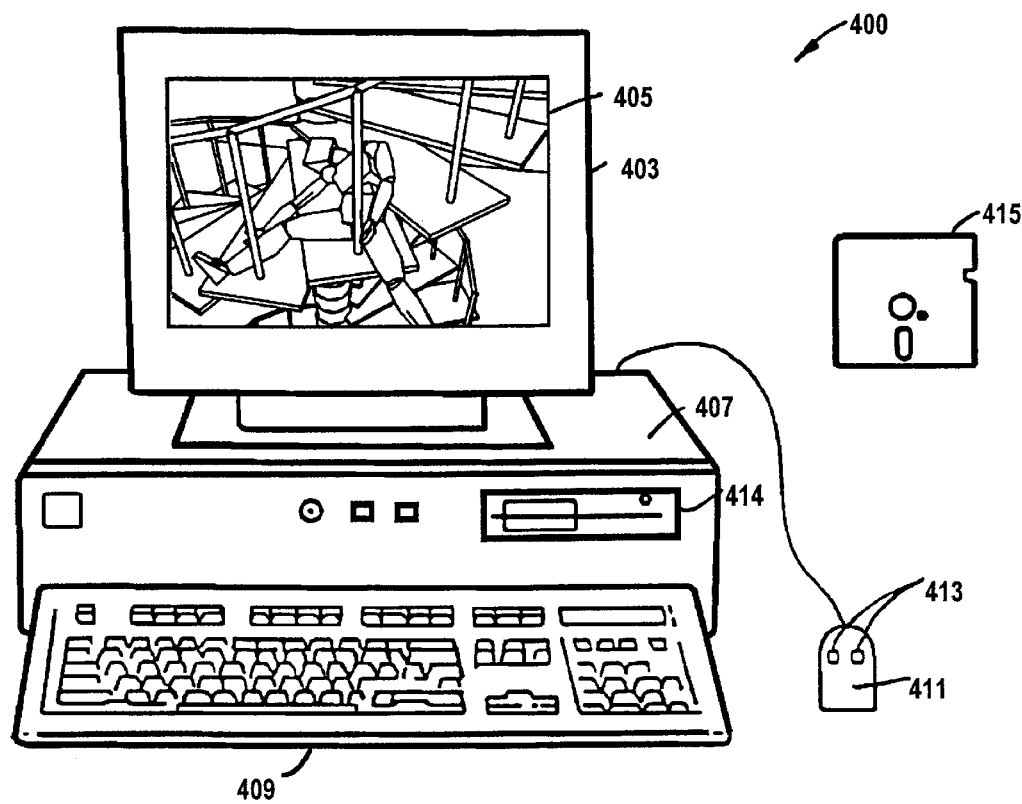
FIG. 36A is an illustration of a general purpose computer operating under the software system according to the present invention.
Figure 36B:
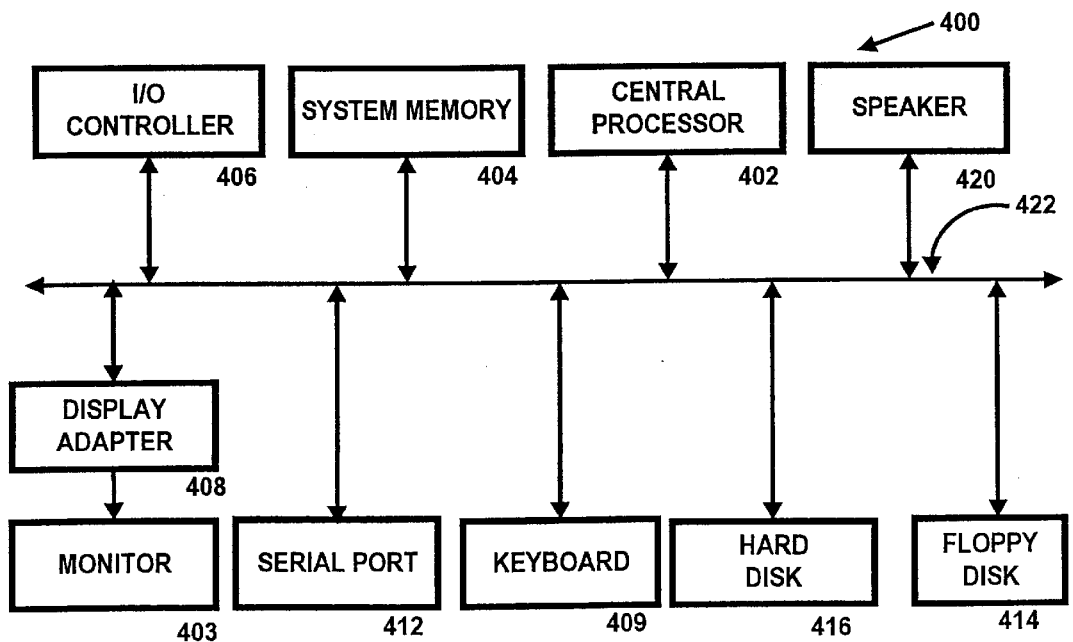
FIG. 36B illustrates the general architecture of the general purpose computer of FIG. 36A.

The description above of the present invention was made in the context of a software system operating on an exemplary general purpose computer 400, as illustrated in FIGS. 36A and 36B. The computer 400 of FIG. 36A includes a monitor 403 with a screen 405, a cabinet 407, a keyboard 409, and a mouse 411. The mouse 411 may have one or more buttons, such as mouse buttons 413. The cabinet 407 houses a floppy disk drive 414, or a hard drive (not shown in FIG. 36A), which may be utilized to store and retrieve software programs incorporating the present invention, input animation data for the computer 400 to carry out the operations according to the present invention, the output graphical images created according to the present invention, and the like. Although a floppy disk 415 is shown, other removable tangible media, including removable hard drive cartridges, CD-ROM, magneto-optical disks and tape, may be utilized.

FIG. 36B illustrates the general architecture of the general purpose computer 400 with a central processor unit 402, system memory 404, I/O controller 406, display adapter 408 for the monitor 403, serial port 412, keyboard 409, hard disk 416, floppy disk 414, and speakers 220, all interconnected by a system bus 422. Other units could include a network interface for connecting the computer 400 to other computing devices.

It should be evident that while the system of the present invention is described in terms of software and a general purpose computer, some, if not all of the elements of the system, may be implemented in "hardware" or "firmware". For example, the display subsystem 17 described with respect to FIG. 19 is implemented with OpenGL, i.e., software. A hard-wired version of the subsystem 17 would eliminate these operations from the central processor unit 402 for faster operations. Likewise, other elements might be "hard-wired" to relieve the burdens from the central processor unit 402 for faster simulated animations. To that extent, the computer becomes less of a general purpose device and more of a dedicated computer.

Finally, it should be noted that the description above is simpliflied to a certain extent for purposes of ease of communication. For example, much of the descriptions above used the example of a single closest points vector and single collisions between pairs of bodies. In fact, for realistic simulations there are often multiple bodies, joints, and collisions. Hence, the present invention should be viewed in the context of handling many bodies, joints including joints associated with many bodies, a multiplicity of closest points vectors, collisions, rotations and so forth. The present invention handles these complex situations efficiently and effectively, much better than previous efforts.

Therefore, while the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A method for the computer animation of a plurality of colliding bodies by the iterative calculation of body positions from previous positions, said method comprising:

receiving data defining physical properties of said bodies, said physical properties including positions and shapes of said bodies, at least one of said colliding bodies having a first body part connected to a second body part by a joint said joint having at least one rotational degree of freedom;

determining a collision between said bodies;

calculating a closest-points vector between said two bodies from said physical properties of said bodies;

calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies;

calculating a position of said t least one of said bodies at a subsequent time interval in response to said contact force upon said body, including positions of said first body part and said second body part;

iteratively repeating said collision determining, closest-points vector calculating, contact force calculating and position calculating steps for subsequent time intervals; and displaying calculated positions of said bodies including said body parts, at selected time intervals for a realistic animation of said colliding bodies.

2. The method of claim 1 wherein said contact force F has the relationship:

$$F = ae^{b(c-x)} - d,$$

where a, b, c, and d are constants, x is the length of the closest-points vector.

3. The method of claim 1 wherein said contact force F has the relationship:

$$F = a/(b-x)$$

where a, and b are constants, and x is the length of the closest-points vector.

4. The method of claim 1 wherein said bodies are defined with incompressible portions, said closest-points vector calculated between said incompressible portions of said two bodies.

5. The method of claim 4 wherein said bodies are defined with compressible portions covering said incompressible portions, said collision determining step comprising determining whether said compressible portions of said bodies are in contact.

6. The method of claim 1 wherein said joint further has a joint limit stop and a maximum allowed rotation limit; said method comprising:
determining a rotation of said first body part about said joint to reach said joint limit stop;
calculating a torque upon said first body part along said one rotational degree of freedom, said torque having a nonlinear relationship with respect to an angle of rotation from said maximum allowed rotation limit such that said torque increases sufficiently rapidly as said angle goes to zero to overcome motions causing said rotation of said first body part about said joint;
calculating a rotational position of said body part at a subsequent time interval in response to said torque upon said body part; and
iteratively repeating said rotation determining, said torque calculating, and said rotational position calculating steps for subsequent time intervals.

7. The method of claim 6 wherein said torque T has the relationship:

$$T = ae^{b(c-\theta)} - d,$$

where a, b, c, and d are constants, and θ is an angle of said body part from said maximum allowed rotation limit.

8. The method of claim 6 wherein said torque T has the relationship:

$$T = a/(b-\theta)$$

where a and b are constants, θ is an angle of said body part from said maximum allowed rotation limit.

9. The method of claim 1 further comprising:
determining a fault in any one of said closest-points vector, contact force, and position calculating steps;
reinitializing said faulty calculating step; and
performing said reinitialized calculating step with a smaller time interval.

10. The method of claim 9 further comprising:
repeating said fault determining, reinitializing and reinitialized calculating step performing steps at smaller and smaller time intervals until said fault is eliminated.

11. The method of claim 9 wherein said smaller time interval is one-half of a previous time interval.

12. The method of claim 9 wherein said fault comprises floating-point numeric overflow.

13. The method of claim 9 wherein said fault comprises said closest-points vector being less than zero.

14. The method of claim 9 wherein said fault comprises physically incorrect collision situations involving excessive interpenetration of bodies.

15. The method of claim 6 further comprising:
determining a fault in any one of said closest-points vector, contact force, position, torque and rotational position calculating steps;
reinitializing said faulty calculating step; and
performing said reinitialized calculating step with a smaller time interval.

16. The method of claim 15 wherein said joint comprises a gimbal joint and said fault comprises said gimbal joint reaching a gimbal lock singularity.

17. The method of claim 15 wherein said rotational position calculating step comprises calculating Euler parameters and said fault comprises non-normalized Euler parameters.

18. The method of claim 15 wherein said fault comprises first body part rotates beyond said maximum allowed rotation limit.

19. A computer program for the realistic computer animation of a plurality of colliding bodies by the iterative calculation of body positions from previous positions, said method comprising:
code that receives data defining physical properties of said bodies, said physical properties including positions and shapes of said bodies, at least one of said colliding bodies having a first body part connected to a second body part by a joint, said joint having at least one rotational degree of freedom;
code that determines a collision between said bodies;
code that calculates a closest-points vector between said two bodies from said physical properties of said bodies;
code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between said bodies;
code that calculates a position of said at least one of said bodies at a subsequent time interval in response to said contact force upon said body, including positions of said first body part and second body part;
code that iteratively repeats said collision determining, closest-points vector calculating, contact force calculating and position calculating steps for subsequent time intervals;
code that allows a computer display to display calculated positions of said bodies, including said first and second body parts, at selected time intervals for a realistic animation of said colliding bodies; and
a computer-readable medium that stores said codes.

20. The computer program of claim 19 wherein said contact force F has the relationship:

$$F = ae^{b(c-x)} - d,$$

where a, b, c, and d are constants, x is the length of the closest-points vector.

21. The computer program of claim 19 wherein said contact force F has the relationship:

$$F=a/(b-x)$$

where a, and b are constants, and x is the length of the closest-points vector.

22. The computer program of claim 19 wherein said bodies are defined with incompressible portions, said closest-points vector calculated between said incompressible portions of said two bodies.

23. The computer program of claim 22 wherein said bodies are defined with compressible portions covering said incompressible portions, said collision determining step comprises code that determines whether said compressible portions of said bodies are in contact.

24. The computer program of claim 19 wherein said joint further has a joint limit stop and a maximum allowed rotation limit; said method comprising:
    code that determines a rotation of said first body part about said joint to reach said joint limit stop;
    code that calculates a torque upon said first body part along said one rotational degree of freedom, said torque having a nonlinear relationship with respect to an angle of rotation from said maximum allowed rotation limit such that said torque increases sufficiently rapidly as said angle goes to zero to overcome motions causing said rotation of said first body part about said joint;
    code that calculates a rotational position of said body part at a subsequent time interval in response to said torque upon said body part; and
    code that iteratively repeats said rotation determining, said torque calculating, and said rotational position calculating steps for subsequent time intervals.

25. The computer program of claim 24 wherein said torque T has the relationship:

$$T=ae^{b(c-\theta)}-d,$$

where a, b, c, and d are constants, and $\theta$ is an angle of said body part from said maximum allowed rotation limit.

26. The method of claim 24 wherein said torque T has the relationship:

$$T=a/(b-\theta)$$

where a and b are constants, $\theta$ is an angle of said body part from said maximum allowed rotation limit.

27. The computer program of claim 19 further comprising:
    code that determines a fault in an operation of any one of said closest-points vector, contact force, and position calculating codes;
    code that reinitializes said faulty operation; and
    code that performs said reinitialized operation with a smaller time interval.

28. The computer program of claim 27 further comprising:
    code that repeats operations of said fault determining, reinitializing and reinitialized operation performing codes at smaller and smaller time intervals until said fault is eliminated.

29. The computer program of claim 27 wherein said smaller time interval is one-half of a previous time interval.

30. The computer program of claim 27 wherein said fault comprises floating-point numeric overflow.

31. The computer program of claim 27 wherein said fault comprises said closest-points vector being less than zero.

32. The computer program of claim 27 wherein said fault comprises physically incorrect collision situations involving excessive interpenetration of bodies.

33. The computer program of claim 24 further comprising:
    code that determines a fault in an operation of any one of said closest-points vector, contact force, position, torque and rotational position calculating codes;
    code that reinitializes said faulty operation; and
    code that performs said reinitialized operation with a smaller time interval.

34. The computer program of claim 33 wherein said joint comprises a gimbal joint and said fault comprises said gimbal joint reaching a gimbal lock singularity.

35. The computer program of claim 33 wherein operation of said rotational position calculating code comprises calculating Euler parameters and said fault comprises non-normalized Euler parameters.

36. The computer program of claim 15 wherein said fault comprises first body part rotating beyond said maximum allowed rotation limit.

* * * * *

US006067096C1

(12) EX PARTE REEXAMINATION CERTIFICATE (4868th)
United States Patent
Nagle

(10) Number: US 6,067,096 C1
(45) Certificate Issued: Oct. 21, 2003

(54) METHOD AND SYSTEM FOR GENERATING REALISTIC COLLISIONS IN GRAPHICAL SIMULATIONS

(75) Inventor: John Nagle, 999 Woodland Ave., Menlo Park, CA (US) 94025

(73) Assignee: John Nagle, Menlo Park, CA (US)

Reexamination Request:
No. 90/005,907, Jan. 8, 2001

Reexamination Certificate for:
| | |
|---|---|
| Patent No.: | 6,067,096 |
| Issued: | May 23, 2000 |
| Appl. No.: | 09/034,847 |
| Filed: | Mar. 4, 1998 |

(51) Int. Cl.$^7$ .................... G06F 17/00; G06T 15/70
(52) U.S. Cl. ................. 345/473; 345/474; 345/958
(58) Field of Search ..................... 345/473–475, 345/958

(56) References Cited

U.S. PATENT DOCUMENTS 5,623,428 A 4/1997 Kunii et al. ............... 364/578

OTHER PUBLICATIONS

Baraff, D. (Co–organizer) and Witkin, A. (Co–organizer), Blum, M., Thumrugoti, U. and Monheit, G., "Physically Based Modeling: Principles and Practice," in *SIGGRAPH 97 Course Notes CD–ROM #1*, Assocation for Computing Machinery, Los Angeles, California, ISBN 0–89791–895–9 (1997).
Barber, C.B., Dobkin, D.P., and Huhdanpaa, H.T., "The Quickhull Algorithm for Convex Hulls," *ACM Transactions on Mathematical Software*, (Dec. 1996).
Cameron, S., "Enhancing GJK: Computing Minimum and Penetration Distances between Convex Polyhedra," Int. Conf. Robotics & Automation, Albuquerque (Apr. 22–24, 1997).
Cohen, J.D., Lin, M.C., Manocha, D. and Ponamgi, M.K., "I–Collide: An Interactive and Exact Collision Detection System for Large–Scale Environments," *Proceedings of ACM Int. 3D Graphics Conference*, Chapel Hill, North Carolina, 189–196 (1995).
Gilbert, E.G., Johnson, D.W. and Keerthi, S.S., "A Fast Procedure for Computing the Distance between Complex Objects in Three–Dimensional Space," *IEEE Journal of Robotics and Automation*, 4(2):193–203 (Apr. 1988).
Lin, M.C. and Canny, J.F., "A Fast Algorithm for Incremental Distance Calculation," *IEEE Int. Conf. Robotics and Automation*, 1008–1014, Berkeley, California (Apr. 1991).
Metaxas, D., "Articulated Figure Dynamics, Behavior and Control," Philadelphia, Pennsylvania (1997).
Rabbitz, R., "Fast Collision Detection of Moving Convex Polyhedra," in *Graphics Gems IV* (Heckbert, P., Ed.), Academic Press, ISBN 0–12–336155–9, 83–109 (1994).
Roark, R. J., "Formulas for Stress and Strain," 1$^{st}$ edition circa 1989, 6$^{th}$ edition published as *Roark's Formulas for Stress and Strain*, ed. by Young, W.C. McGraw–Hill, ISBN 0–07–072541–1, Table 33, 650–653 (1989).

(List continued on next page.)

Primary Examiner—Mano Padmanabhan

(57) ABSTRACT

A method of computer operation and a software system for operating a computer to generate realistic collisions between animated bodies. The system operates the computer to iteratively calculate of body positions from previous positions using a simulated contact force between colliding bodies which has a nonlinear relationship with respect to the closest-points vector defined between the bodies such that the force increases sufficiently rapidly as the closest-points vector goes to zero to overcome the motions causing the collision between the bodies. The present invention also uses a similar relationship between a limiting torque for body part joints and a maximum allowed rotation for a joint for realtistic motions of articulated body parts connected by joints.

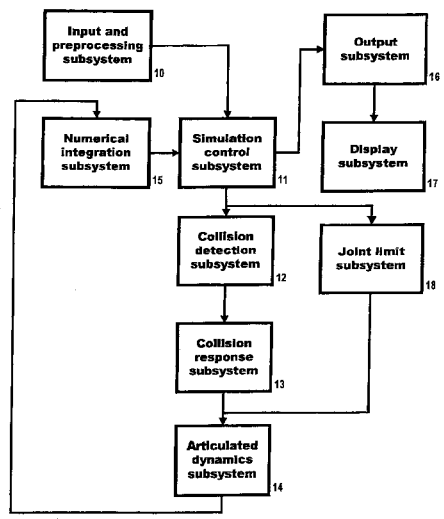

OTHER PUBLICATIONS

Witkin, A. (Co–organizer), Baraff, D. (Co–organizer), Blum, M., Thumrugoti, U. and Monheit, G., "Constrained Dynamics" in *SIGGRAPH 97 Course Notes CD–ROM #1, Physically Based Modeling,* Association for Computing Machinery, Los Angeles, California, ISBN 0–89791–895–9 (1997).

Mirtich, B.V., "Impulse–based Dynamic Simulation of Rigid Body Systems," Ph.D. thesis, University of California, Berkeley (Dec. 1996).

Moore, M. and Wilhelms, J., Collision Detection and Response for Computer Animation, *Computer Graphics,* vol. 22, No. 4, 289–298, Aug. 1988.

McKenna, M. and Zeltzer, D., "Dynamic Simulation of Autonomous Legged Locomotion," from the Proceedings of *SIGGRAPH 90,* Aug. 1990, in *Computer Graphics 24*(3), pp. 29–38.

US 6,067,096 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 19–21 and 36 are determined to be patentable as amended.

Claims 4–18 and 22–35, dependent on an amended claim, are determined to be patentable.

New claims 37–60 are added and determined to be patentable.

1. A method for the computer animation of [a plurality of] colliding bodies by the iterative calculation of body positions from previous positions, said method comprising:
  receiving data defining physical properties of [said] *a plurality of* bodies, said physical properties including positions and shapes of said bodies, at least one of said [colliding] bodies having a first body part connected to a second body part by a joint said joint having at least one rotational degree of freedom;
  determining [a] collision*s* between said bodies *by*;
  *defining at least one boundary associated with each said body;*
  *detecting overlap of said boundaries;*
  calculating a closest-points vector *only* between [said two] bodies [from said physical properties of said bodies] *having overlapping boundaries, said closest-points vector being calculated by selecting a set of points on said bodies, calculating the value of a distance function using said points, iteratively changing at least one of said points, recalculating the value of the distance function, comparing the results of the present calculation to the results of previous calculations to converge on a closest points solution without exhaustively calculating the value of the distance function for all points on said bodies, and terminating further iterations when the results of said calculations no longer converge; and*
  comparing each said closest-points vector to a predetermined constant to determine contact between said bodies;
  calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies;
  *prior to said contact force calculating step, automatically determining parametric constants for said contact force, said automatically determined parametric constants providing a realistic force and distance relationship between said colliding bodies without manual adjustment;*
  calculating a position of said *at* least one of said bodies at a subsequent time interval in response to said contact force upon said body, including positions of said first body part and said second body part;
  iteratively repeating said collision determining, closest-points vector calculating, contact force calculating and position calculating steps for subsequent time intervals; and
  displaying calculated positions of said bodies including said body parts, at selected time intervals for a realistic animation of said colliding bodies.

2. The method of claim 1 wherein said contact force F has the relationship:

$$F = ae^{b(c-x)} - d,$$

where a, b, c, and d [are] *comprise said parametric* constants, x is the length of the closest-points vector.

3. The method of claim 1 wherein said contact force F has the relationship:

$$F = a/(b-x)$$

where a, and b [are] *comprise said parametric* constants, and x is the length of the closest-points vector.

19. A computer program for the realistic computer animation of [a plurality of] colliding bodies by the iterative calculation of body positions from previous positions, said [method] *program* comprising:
  code that receives data defining physical properties of [said] *a plurality of* bodies, said physical properties including positions and shapes of said bodies, at least one of said [colliding] bodies having a first body part connected to a second body part by a joint, said joint having at least one rotational degree of freedom;
  code that determines [a] collision*s* between said bodies, *including:*
  *code that defines at least one boundary associated with each said body;*
  *code that detects overlap of said boundaries;*
  code that calculates a closest-points vector *only* between [said two] bodies [from said physical properties of said bodies] *having overlapping boundaries, including code that selects a set of points on said bodies, code that calculates the value of a distance function using said points, code that iteratively changes at least one of said points, code that recalculates the value of the distance function, code that compares the results of the present calculation to the results of previous calculations to converge on a closest points solution without exhaustively calculating the value of the distance function for all points on said bodies, and code that terminates further iterations when the results of said calculations no longer converge; and*
  code that compares each said closest-points vector to a predetermined constant to determine contact between said bodies;
  code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between said bodies;
  *code that automatically determines parametric constants for said contact force prior to said contact force* calculating step, said automatically determined parametric constants providing a realistic force and distance relationship between said colliding bodies without manual adjustment;

code that calculates a position of said at least one of said bodies at a subsequent time interval in response to said contact force upon said body, including positions of said first body part and second body part;

code that iteratively repeats said collision determining, closest-points vector calculating, contact force calculating and position calculating steps for subsequent time intervals;

code that allows a computer display to display calculated positions of said bodies, including said first and second body parts, at selected time intervals for a realistic animation of said colliding bodies; and a computer-readable medium that stores said codes.

20. The computer program of claim 19 wherein said contact force F has the relationship:

$$F = ae^{b(c-x)} - d,$$

where a, b, c, and d [are] *comprise said parametric* constants, x is the length of the closest-points vector.

21. The computer program of claim 19 wherein said contact force F has the relationship:

$$F = a/(b-x)$$

where a, and b [are] *comprise said parametric* constants, and x is the length of the closest-points vector.

36. The computer program of claim [15] *33* wherein said fault comprises first body part rotating beyond said maximum allowed rotation limit.

37. The method of claim 1 wherein said parametric constants determining step sets said parametric constants so that said nonlinear relationship of said contact force generates at said minimum allowed closest-point vector a maximum contact force large enough so that no reasonably possible collision can generate a contact force of greater magnitude.

38. The method of claim 1 wherein said parametric constants determining step sets said parametric constants related to dimensional information of said colliding bodies.

39. The computer program of claim 19 wherein said parametric determining code sets said parametric constants so that said nonlinear relationship of said contact force generates at said minimum allowed closest-point vector a maximum contact force large enough so that no reasonably possible collision can generate a contact force of greater magnitude.

40. The computer program of claim 19 wherein said parametric determining code sets said parametric constants related to dimensional information of said colliding bodies.

*41. A method for the computer animation of a plurality of colliding bodies by the iterative calculation of body positions from previous positions, said method comprising:*

*receiving data defining physical properties of said bodies, said physical properties including positions and shapes of said bodies, at least one of said colliding bodies having a first body part connected to a second body part by a joint said joint having at least one rotational degree of freedom, said bodies being defined with compressible and incompressible portions, said compressible portions covering said incompressible portions;*

*determining a collision between said bodies, including determining whether said compressible portions of said bodies are in contact;*

*calculating a closest-points vector between said two bodies from said physical properties of said bodies, said closest-points vector being calculated between said incompressible portions of said two bodies;*

*calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies;*

*prior to said contact force calculating step, determining parametric constants for said contact force to provide a well-behaved force/distance relationship so as to avoid manual intervention of said method;*

*calculating a position of said at least one of said bodies at a subsequent time interal in response to said contact force upon said body, including positions of said first body part and said second body part;*

*iteratively repeating said collision determining, closest-points vector calculating, contact force calculating and position calculating steps for subsequent time intervals; and*

*displaying calculated positions of said bodies including said body parts, at selected time intervals for a realistic animation of said colliding bodies.*

*42. A method for the computer animation of a plurality of colliding bodies by the iterative calculation of body positions from previous positions, said method comprising:*

*receiving data defining physical properties of said bodies, said physical properties including positions and shapes of said bodies, at least one of said colliding bodies having a first body part connected to a second body part by a joint, said joint having at least one rotational degree of freedom, a joint limit stop, and a maximum allowed rotation limit;*

*determining a collision between said bodies;*

*calculating a closest-points vector between said two bodies from said physical properties of said bodies;*

*calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies, including:*

*determining a rotation of said first body part about said joint to reach said joint limit stop;*

*calculating a torque upon said first body part along said one rotational degree of freedom, said torque having a nonlinear relationship with respect to an angle of rotation from said maximum allowed rotation limit such that said torque increases sufficiently rapidly as said angle goes to zero to overcome motions causing said rotation of said first body part about said joint;*

*prior to said contact force calculating step, determining parametric constants for said contact force to provide a well-behaved force/distance relationship so as to avoid manual intervention of said method;*

*calculating a position of said at least one of said bodies at a subsequent time interval in response to said contact force upon said body, including positions of said first body part and said second body part, further including calculating a rotational position of said first body part in response to said torque upon said first body part;* iteratively repeating said collision determining, closest-points vector calculating, contact force calculating and position calculating steps, including said rotation determining, torque calculating, and rotational position calculating steps, for subsequent time intervals; and displaying calculated positions of said bodies including said body parts, at selected time intervals for a realistic animation of said colliding bodies.

43. The method of claim 42 wherein torque T has the relationship:

$$T=ae^{b(c-\theta)}-d,$$

where a, b, c, and d are constants and $\theta$ is an angle of said first body part from said maximum allowed rotation limit.

44. The method of claim 42 wherein torque T has the relationship:

$$T=a/(b-\theta),$$

where a and b are constants, $\theta$ is an angle of said first body part from said maximum allowed rotation limit.

45. A method for the computer animation of a plurality of colliding bodies by the iterative calculation of body positions from previous positions, said method comprising:

receiving data defining physical properties of said bodies, said physical properties including positions and shapes of said bodies, at least one of said colliding bodies having a first body part connected to a second body part by a joint said joint having at least one rotational degree of freedom,;

determining a collision between said bodies;

calculating a closest-points vector between said two bodies from said physical properties of said bodies;

calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies;

prior to said contact force calculating step, determining parametric constants for said contact force to provide a well-behaved force/distance relationship so as to avoid manual intervention of said method;

calculating a position of said at least one of said bodies at a subsequent time interval in response to said contact force upon said body, including positions of said first body part and said second body part;

iteratively repeating said collision determining, closest-points vector calculating, contact force calculating and position calculating steps for subsequent time intervals;

determining a fault in any one of said closest-points vector, contact force, and position calculating steps, wherein said fault comprises floating-point numeric overflow;

reinitializing said faulty calculating step;

performing said reinitialized calculating step with a smaller time interval; and displaying calculated positions of said bodies including said body parts, at selected time intervals for a realistic animation of said colliding bodies.

46. The method of claim 42 comprising:

determining a fault in any one of said closest-points vector, contact force, position, torque and rotational position calculating steps;

reinitializing said faulty calculating step; and performing said reinitialized calculating step with a smaller time interval.

47. The method of claim 46 wherein said joint comprises a gimbal joint and said fault comprises said gimbal joint reaching a gimbal lock singularity.

48. The method of claim 46 wherein said rotational position calculating step comprises calculating Euler parameters and said fault comprises non-normalized Euler parameters.

49. The method of claim 46 wherein said fault comprises first body part rotates beyond said maximum allowed rotation limit.

50. A computer program for the realistic computer animation of a plurality of colliding bodies by the iterative calculation of body positions from previous positions, said program comprising:

code that receives data defining physical properties of said bodies, said physical properties including positions and shapes of said bodies, at least one of said colliding bodies having a first body part connected to a second body part by a joint, said joint having at least one rotational degree of freedom, said bodies being defined with compressible and incompressible portions, said compressible portions covering said incompressible portions;

code that determines a collision between said bodies, including code that determines whether said compressible portions of said bodies are in contact;

code that calculates a closest-points vector between said two bodies from said physical properties of said bodies, including code that calculates said closest-points vector between said incompressible portions of said two bodies;

code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between said bodies;

code that determines parametric constants for said contact force to provide a well-behaved force/distance relationship so as to avoid manual intervention of said method, prior to said contact force calculating step;

code that calculates a position of said at least one of said bodies at a subsequent time interval in response to said contact force upon said body, including positions of said first body part and second body part;

code that iteratively repeats said collision determining, closest-points vector calculating, contact force calculating and position calculating steps for subsequent time intervals;

code that allows a computer display to display calculated positions of said bodies, including said first and second body parts, at selected time intervals for a realistic animation of said colliding bodies; and a computer-readable medium that stores said codes.

51. A computer program for the realistic computer animation of a plurality of colliding bodies by the iterative calculation of body positions from previous positions, said program comprising:

code that receives data defining physical properties of said bodies, said physical properties including positions and shapes of said bodies, at least one of said colliding bodies having a first body part connected to a second body part by a joint, said joint having at least one rotational degree of freedom, a joint limit stop, and a maximum allowed rotation limit;

code that determines a collision between said bodies;

code that calculates a closest-points vector between said two bodies from said physical properties of said bodies;

code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing collisions between said bodies, including:

code that determines a rotation of said first body part about said joint to reach said joint limit stop; and code that calculates a torque upon said first body part along one rotational degree of freedom, said torque having a nonlinear relationship with respect to an angle of rotation from said maximum allowed rotation limit such that said torque increases sufficiently rapidly as said angle goes to zero to overcome motions causing said rotation of said first body part about said joint;

code that determines parametric constants for said contact force to provide a well-behaved force/distance relationship so as to avoid manual intervention of said method, prior to said contact force calculating step;

code that calculates a position of said at least one of said bodies at a subsequent time interval in response to said contact force upon said body, including positions of said first body part and second body part, including code that calculates a rotational position of said first body part in response to said torque upon said first body part;

code that iteratively repeats said collision determining, closest-points vector calculating, contact force calculating and position calculating steps for subsequent time intervals, including code that iteratively repeats said rotation determining, torque calculating, and rotational position calculating steps;

code that allows a computer display to display calculated positions of said bodies, including said first and second body parts, at selected time intervals for a realistic animation of said colliding bodies; and a computer-readable medium that stores said codes.

52. The computer program of claim 51 wherein torque T has the relationship:

$$T=ae^{b(c-\theta)}-d,$$

where a, b, c, and d are constants and θ is an angle of said first body part from said maximum allowed rotation limit.

53. The computer program of claim 51 wherein said torque T has the relationship:

$$T=a/(b-\theta),$$

where a and b are constants, θ is an angle of said first body part from said maximum allowed rotation limit.

54. A computer program for the realistic computer animation of a plurality of colliding bodies by the iterative calculation of body positions from previous positions, said program comprising:

code that receives data defining physical properties of said bodies, said physical properties including positions and shapes of said bodies, at least one of said colliding bodies having a first body part connected to a second body part by a joint, said joint having at least one rotational degree of freedom;

code that determines a collision between said bodies;

code that calculates a closest-points vector between said two bodies from said physical properties of said bodies;

code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between said bodies;

code that determines parametric constants for said contact force to provide a well-behaved force/distance relationship so as to avoid manual intervention of said method, prior to said contact force calculating step;

code that calculates a position of said at least one of said bodies at a subsequent time interval in response to said contact force upon said body, including positions of said first body part and second body part;

code that iteratively repeats said collision determining, closest-points vector calculating, contact force calculating and position calculating steps for subsequent time intervals;

code that determines a fault in an operation of any one of said closest-points vector, contact force, and position calculating codes, wherein said fault comprises floating-point numeric overflow;

code that reinitializes said faulty operation;

code that performs said reinitialized operation with a smaller time interval;

code that allows a computer display to display calculated positions of said bodies, including said first and second body parts, at selected time intervals for a realistic animation of said colliding bodies; and a computer-readable medium that stores said codes.

55. The computer program of claim 51 comprising:

code that determines a fault in an operation of any one of said closest-points vector, contact force, position, torque and rotational position calculating codes;

code that reinitializes said faulty operation; and code that performs said reinitialized operation with a smaller time interval.

56. The computer program of claim 55 wherein said joint comprises a gimbal joint and said fault comprises said gimbal joint reaching a gimbal lock singularity.

57. The computer program of claim 55 wherein said rotational position calculating step comprises calculating Euler parameters and said fault comprises non-normalized Euler parameters.

58. The computer program of claim 55 wherein said fault comprises first body part rotating beyond said maximum allowed rotation limit.

59. A method for the computer animation of a plurality of colliding bodies by the iterative calculation of body positions from previous positions, said method comprising:

receiving data defining physical properties of said bodies, said physical properties including positions and shapes of said bodies, at least one of said colliding bodies having a first body part connected to a second body part by a joint said joint having at least one rotational degree of freedom;

determining a collision between said bodies;

calculating a closest-points vector between said two bodies from said physical properties of said bodies;

calculating a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between bodies;

calculating a friction velocity vector perpendicular to said closest points vector for each point of contact between said two bodies;

calculating a friction force vector in the direction opposed to said friction velocity vector;

calculating a position of said at least one of said bodies at a subsequent time interval in response to said contact force upon said body, including positions of said first body part and said second body part;

iteratively repeating said collision determining, closest-points vector calculating, contact force calculating and position calculating steps for subsequent time intervals; and displaying calculated positions of said bodies including said body parts, at selected time intervals for a realistic animation of said colliding bodies.

60. A computer program for the realistic computer animation of a plurality of colliding bodies by the iterative calculation of body positions from previous positions, said program comprising:

code that receives data defining physical properties of said bodies, said physical properties including positions and shapes of said bodies, at least one of said colliding bodies having a first body part connected to a second body part by a joint, said joint having at least one rotational degree of freedom;

code that determines a collision between said bodies;

code that calculates a closest-points vector between said two bodies from said physical properties of said bodies;

code that calculates a contact force on said at least one of said bodies, said contact force along said closest-points vector and having a nonlinear relationship with respect to said closest-points vector such that said force increases sufficiently rapidly as said closest-points vector goes to zero to overcome motions causing said collisions between said bodies;

code that calculates a friction velocity vector perpendicular to said closest points vector for each point of contact between said two bodies;

code that calculates a friction force vector in the direction opposed to said friction velocity vector;

code that calculates a position of said at least one of said bodies at a subsequent time interval in response to said contact force upon said body, including positions of said first body part and second body part;

code that iteratively repeats said collision determining, closest-points vector calculating, contact force calculating and position calculating steps for subsequent time intervals;

code that allows a computer display to display calculated positions of said bodies, including said first and second body parts, at selected time intervals for a realistic animation of said colliding bodies; and a computer-readable medium that stores said codes.

* * * * *